(12) United States Patent
Yamamoto

(10) Patent No.: US 11,437,645 B2
(45) Date of Patent: Sep. 6, 2022

(54) ELECTROLYTE, BATTERY, ELECTRONIC APPARATUS, AND METHODS FOR PRODUCING ELECTROLYTE AND BATTERY

(71) Applicant: SEIKO EPSON CORPORATION, Tokyo (JP)

(72) Inventor: Hitoshi Yamamoto, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 240 days.

(21) Appl. No.: 16/715,417

(22) Filed: Dec. 16, 2019

(65) Prior Publication Data
US 2020/0194830 A1  Jun. 18, 2020

(30) Foreign Application Priority Data
Dec. 17, 2018  (JP) .............................. JP2018-235177

(51) Int. Cl.
| H01M 10/0562 | (2010.01) |
| H01M 10/058 | (2010.01) |
| H01M 10/052 | (2010.01) |
| H01M 4/38 | (2006.01) |
| H01M 4/36 | (2006.01) |

(52) U.S. Cl.
CPC ....... H01M 10/0562 (2013.01); H01M 4/362 (2013.01); H01M 4/382 (2013.01); H01M 10/052 (2013.01); H01M 10/058 (2013.01); H01M 2300/008 (2013.01); H01M 2300/0077 (2013.01); H01M 2300/0091 (2013.01)

(58) Field of Classification Search
None
See application file for complete search history.

(56) References Cited

U.S. PATENT DOCUMENTS

| 2015/0118571 A1* | 4/2015 | Liu ........................ C04B 35/486 |
| | | 429/319 |
| 2016/0056500 A1* | 2/2016 | Holme .............. H01M 10/0525 |
| | | 429/319 |
| 2019/0097267 A1* | 3/2019 | Yokoyama .............. C04B 35/01 |

FOREIGN PATENT DOCUMENTS

| CN | 110176627 A | | 8/2019 |
| JP | 2009-215130 A | | 9/2009 |
| JP | 2011-113655 A | | 6/2011 |
| WO | WO2017159571 | * | 9/2017 |

* cited by examiner

*Primary Examiner* — Christopher P Domone
(74) *Attorney, Agent, or Firm* — Oliff PLC

(57) ABSTRACT

An electrolyte according to the present disclosure contains a lithium composite metal oxide represented by the following compositional formula.

$$Li_{7-x}La_3(Zr_{2-x}A_x)O_{12-y}F_y$$

In the formula, 0.1≤x≤1.0, 0.0<y≤1.0, and A represents two or more types of Ta, Nb, and Sb.

11 Claims, 16 Drawing Sheets

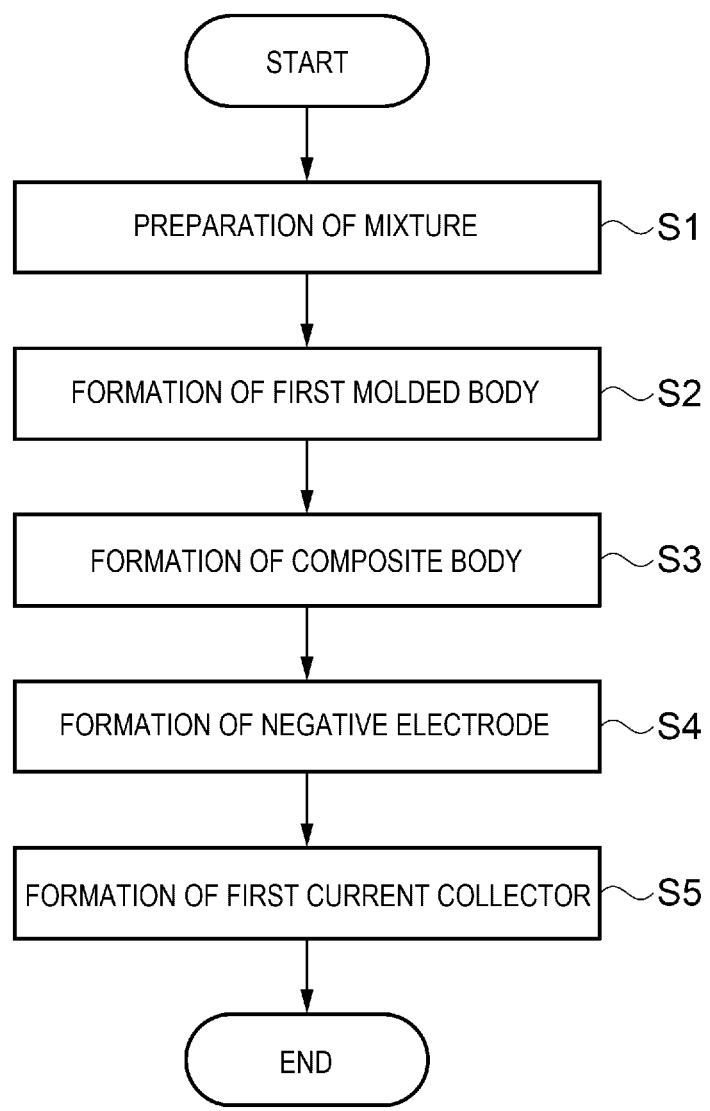

FIG. 4D

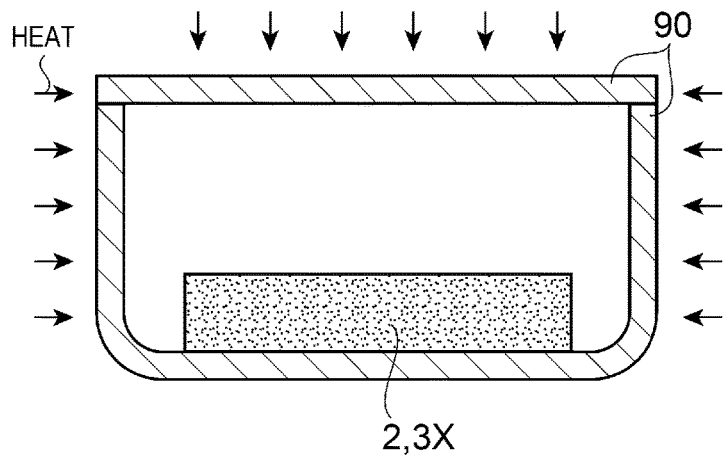

FIG. 5

| | COMPOSITION OF ELECTROLYTE | FLUORINE-CONTAINING COMPOUND USED | FIRING CONDITION | |
|---|---|---|---|---|
| | | | CALCINATION | MAIN FIRING |
| EXAMPLE 1 | $Li_{6.3}La_3Zr_{1.3}Sb_{0.5}Ta_{0.2}O_{11}F_1$ | PVDF | 540°C×1H | 900°C×8H |
| EXAMPLE 2 | $Li_{6.3}La_3Zr_{1.3}Sb_{0.5}Ta_{0.2}O_{11}F_1$ | PVDF | 540°C×1H | 1000°C×8H |
| EXAMPLE 3 | $Li_{6.2}La_3Zr_{1.2}Sb_{0.4}Ta_{0.4}O_{11}F_1$ | LiF | 540°C×1H | 1000°C×8H |
| EXAMPLE 4 | $Li_{5.95}La_3Zr_{0.95}Sb_{0.4}Ta_{0.4}Nb_{0.25}O_{11}F_1$ | LiF | 540°C×1H | 1000°C×8H |
| EXAMPLE 5 | $Li_{5.95}La_3Zr_{0.95}Sb_{0.4}Ta_{0.4}Nb_{0.25}O_{11}F_1$ | PVDF | 540°C×1H | 1000°C×8H |
| EXAMPLE 6 | $Li_{6.35}La_3Zr_{1.35}Sb_{0.4}Nb_{0.25}O_{11}F_1$ | PVDF | 540°C×1H | 1000°C×8H |
| EXAMPLE 7 | $Li_{6.7}La_3Zr_{1.7}Ta_{0.05}Nb_{0.25}O_{11}F_1$ | PVDF | 540°C×1H | 1000°C×8H |
| COMPARATIVE EXAMPLE 1 | $Li_{6.3}La_3Zr_{1.3}Sb_{0.5}Ta_{0.2}O_{12}$ | NOT USED | 540°C×1H | 900°C×8H |
| COMPARATIVE EXAMPLE 2 | $Li_{6.3}La_3Zr_{1.3}Sb_{0.5}Ta_{0.2}O_{12}$ | NOT USED | 540°C×1H | 1000°C×8H |

FIG. 6

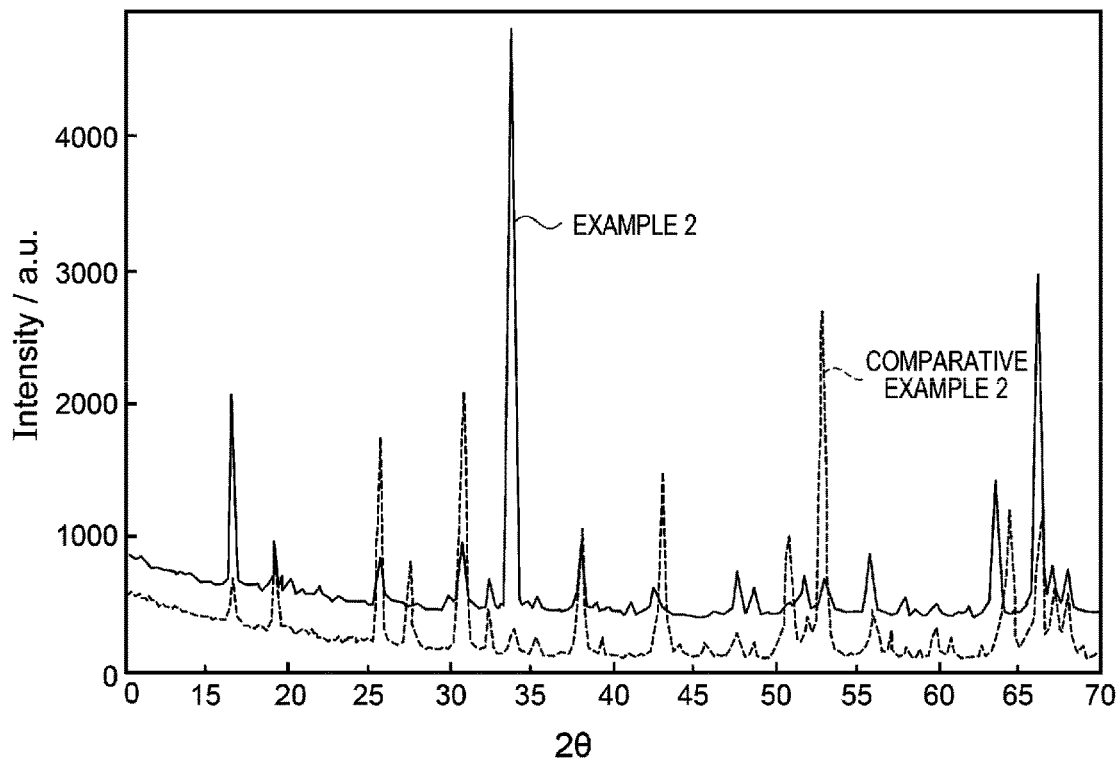

FIG. 7

| | COMPOSITION OF ELECTROLYTE | TOTAL ION CONDUCTIVITY [S/cm] |
|---|---|---|
| EXAMPLE 1 | $Li_{6.3}La_3Zr_{1.3}Sb_{0.5}Ta_{0.2}O_{11}F_1$ | $3.0\times10^{-4}$ |
| EXAMPLE 2 | $Li_{6.3}La_3Zr_{1.3}Sb_{0.5}Ta_{0.2}O_{11}F_1$ | $3.0\times10^{-4}$ |
| EXAMPLE 3 | $Li_{6.2}La_3Zr_{1.2}Sb_{0.4}Ta_{0.4}O_{11}F_1$ | $2.8\times10^{-4}$ |
| EXAMPLE 4 | $Li_{5.95}La_3Zr_{0.95}Sb_{0.4}Ta_{0.4}Nb_{0.25}O_{11}F_1$ | $2.8\times10^{-4}$ |
| EXAMPLE 5 | $Li_{5.95}La_3Zr_{0.95}Sb_{0.4}Ta_{0.4}Nb_{0.25}O_{11}F_1$ | $2.8\times10^{-4}$ |
| EXAMPLE 6 | $Li_{6.35}La_3Zr_{1.35}Sb_{0.4}Nb_{0.25}O_{11}F_1$ | $2.9\times10^{-4}$ |
| EXAMPLE 7 | $Li_{6.7}La_3Zr_{1.7}Ta_{0.05}Nb_{0.25}O_{11}F_1$ | $5.0\times10^{-4}$ |
| COMPARATIVE EXAMPLE 1 | $Li_{6.3}La_3Zr_{1.3}Sb_{0.5}Ta_{0.2}O_{12}$ | $1.2\times10^{-4}$ |
| COMPARATIVE EXAMPLE 2 | $Li_{6.3}La_3Zr_{1.3}Sb_{0.5}Ta_{0.2}O_{12}$ | $1.2\times10^{-4}$ |

FIG. 10

| | ELECTROLYTE COMPOSITION OF CALCINED BODY |
|---|---|
| EXAMPLE 8 | $Li_{6.2}La_3Zr_{1.2}Sb_{0.4}Ta_{0.4}O_{12}$ |
| EXAMPLE 9 | $Li_{5.95}La_3Zr_{0.95}Sb_{0.4}Ta_{0.4}Nb_{0.25}O_{12}$ |
| EXAMPLE 10 | $Li_{6.35}La_3Zr_{1.35}Sb_{0.4}Nb_{0.25}O_{12}$ |
| EXAMPLE 11 | $Li_{6.7}La_3Zr_{1.7}Ta_{0.05}Nb_{0.25}O_{12}$ |
| EXAMPLE 12 | $Li_{6.35}La_3Zr_{1.35}Sb_{0.4}Nb_{0.25}O_{12}$ |
| COMPARATIVE EXAMPLE 3 | $Li_{6.2}La_3Zr_{1.2}Sb_{0.4}Ta_{0.4}O_{12}$ |
| COMPARATIVE EXAMPLE 4 | $Li_{6.2}La_3Zr_{1.2}Sb_{0.4}Ta_{0.4}O_{12}$ |
| COMPARATIVE EXAMPLE 5 | $Li_{6.2}La_3Zr_{1.2}Sb_{0.4}Ta_{0.4}O_{12}$ |

FIG. 11

| | COMPOSITION OF ELECTROLYTE | TOTAL ION CONDUCTIVITY [S/cm] |
|---|---|---|
| EXAMPLE 8 | $Li_{6.2}La_3Zr_{1.2}Sb_{0.4}Ta_{0.4}O_{11}F_1$ | $2.8 \times 10^{-4}$ |
| EXAMPLE 9 | $Li_{5.95}La_3Zr_{0.95}Sb_{0.4}Ta_{0.4}Nb_{0.25}O_{11}F_1$ | $2.8 \times 10^{-4}$ |
| EXAMPLE 10 | $Li_{6.35}La_3Zr_{1.35}Sb_{0.4}Nb_{0.25}O_{11}F_1$ | $2.9 \times 10^{-4}$ |
| EXAMPLE 11 | $Li_{6.7}La_3Zr_{1.7}Ta_{0.05}Nb_{0.25}O_{11}F_1$ | $5.0 \times 10^{-4}$ |
| EXAMPLE 12 | $Li_{6.35}La_3Zr_{1.35}Sb_{0.4}Nb_{0.25}O_{11.5}F_{0.5}$ | $2.4 \times 10^{-4}$ |
| COMPARATIVE EXAMPLE 3 | $Li_{6.2}La_3Zr_{1.2}Sb_{0.4}Ta_{0.4}O_{12}$ | $1.1 \times 10^{-4}$ |
| COMPARATIVE EXAMPLE 4 | $Li_{6.2}La_3Zr_{1.2}Sb_{0.4}Ta_{0.4}O_7F_5$ | $5.5 \times 10^{-7}$ |
| COMPARATIVE EXAMPLE 5 | $Li_{6.2}La_3Zr_{1.2}Sb_{0.4}Ta_{0.4}O_{10.5}F_{1.5}$ | $1.5 \times 10^{-6}$ |

ELECTROLYTE, BATTERY, ELECTRONIC APPARATUS, AND METHODS FOR PRODUCING ELECTROLYTE AND BATTERY

The present application is based on, and claims priority from JP Application Serial Number 2018-235177, filed on Dec. 7, 2018, the disclosure of which is hereby incorporated by reference herein in its entirety.

BACKGROUND

1. Technical Field

The present disclosure relates to an electrolyte, a battery, an electronic apparatus, and methods for producing an electrolyte and a battery.

2. Related Art

Heretofore, there has been known a lithium secondary battery using a compound having a garnet-type crystal structure as an inorganic electrolyte. For example, JP-A-2011-113655 (Patent Document 1) proposes a garnet-type oxide, in which the zirconium site is partially substituted with niobium or the like in lithium lanthanum zirconate having a garnet-type crystal structure.

However, the garnet-type oxide described in Patent Document 1 has a problem that when firing is performed at a low temperature, sufficient sintering does not occur at an interface between crystal grains, and therefore, it is difficult to achieve both decrease in the grain boundary resistance of crystal grains and improvement of the lithium ion conduction property.

SUMMARY

An electrolyte according to an aspect of the present disclosure contains a lithium composite metal oxide represented by the following compositional formula.

$$Li_{7-x}La_3(Zr_{2-x}A_x)O_{12-y}F_y$$

In the formula, $0.1 \leq x \leq 1.0$, $0.0 < y \leq 1.0$, and A represents two or more types of Ta, Nb, and Sb.

A battery according to an aspect of the present disclosure includes a composite body including the electrolyte according to the aspect of the present disclosure and an active material, an electrode provided at one face of the composite body, and a current collector provided at another face opposite to the one face of the composite body.

In the battery, the active material may be a positive electrode active material containing Li and O.

In the battery, the electrode may be metallic Li.

An electronic apparatus according to an aspect of the present disclosure includes the battery according to the aspect of the present disclosure.

A method for producing an electrolyte according to an aspect of the present disclosure includes preparing a mixture by mixing a plurality of types of raw materials containing elements constituting a lithium composite metal oxide represented by the following compositional formula, forming a calcined body by subjecting the mixture to a first heating treatment, and forming a crystalline electrolyte by subjecting the calcined body to a second heating treatment.

$$Li_{7-x}La_3(Zr_{2-x}A_x)O_{12-y}F_y$$

In the formula, $0.1 \leq x \leq 1.0$, $0.0 < y \leq 1.0$, and A represents two or more types of Ta, Nb, and Sb.

In the method for producing an electrolyte, in the preparing the mixture, the mixture containing a fluorine-containing polymer compound as the raw material may be prepared.

In the method for producing an electrolyte, in the preparing the mixture, the mixture containing a fluorine-containing inorganic compound as the raw material may be prepared.

In the method for producing an electrolyte, in the preparing the mixture, the mixture in a liquid state may be prepared.

A method for producing an electrolyte according to an aspect of the present disclosure includes preparing a first mixture by mixing a plurality of types of raw materials containing elements constituting a lithium composite metal oxide represented by the following compositional formula, forming a calcined body by subjecting the first mixture to a first heating treatment, preparing a second mixture by mixing the calcined body with a fluorine-containing inorganic compound, and forming a crystalline electrolyte by subjecting the second mixture to a second heating treatment.

$$Li_{7-x}La_3(Zr_{2-x}A_x)O_{12}$$

In the formula, $0.1 \leq x \leq 1.0$, and A represents two or more types of Ta, Nb, and Sb.

In the method for producing an electrolyte, a heating temperature in the first heating treatment may be 500° C. or higher and 650° C. or lower, and a heating temperature in the second heating treatment may be 800° C. or higher and 1000° C. or lower.

A method for producing a battery according to an aspect of the present disclosure includes preparing a mixture by mixing a plurality of types of raw materials containing elements constituting a lithium composite metal oxide represented by the following compositional formula, forming a calcined body by subjecting the mixture to a first heating treatment, molding the calcined body after grinding the calcined body, forming a fired body by subjecting the molded calcined body to a second heating treatment, preparing a slurry by grinding the fired body and thereafter mixing the ground fired body with a solvent, forming a first molded body using an active material, forming a composite body including the first molded body and an electrolyte portion containing a crystalline electrolyte by performing a third heating treatment in a state where the slurry and the first molded body are brought into contact with each other, and forming a current collector for the composite body.

$$Li_{7-x}La_3(Zr_{2-x}A_x)O_{12-y}F_y$$

In the formula, $0.1 \leq x \leq 1.0$, $0.0 < y \leq 1.0$, and A represents two or more types of Ta, Nb, and Sb.

A method for producing a battery according to an aspect of the present disclosure includes preparing a first mixture by mixing a plurality of types of raw materials containing elements constituting a lithium composite metal oxide represented by the following compositional formula, forming a calcined body by subjecting the first mixture to a first heating treatment, preparing a second mixture by mixing the calcined body with a fluorine-containing inorganic compound, forming a fired body by subjecting the second mixture to a second heating treatment, preparing a slurry by grinding the fired body and thereafter mixing the ground fired body with a solvent, forming a first molded body using an active material, forming a composite body including the first molded body and an electrolyte portion containing a crystalline electrolyte by performing a third heating treatment in a state where the slurry and the first molded body are brought into contact with each other, and forming a current collector for the composite body.

$Li_{7-x}La_3(Zr_{2-x}A_x)O_{12}$

In the formula, $0.1 \leq x \leq 1.0$, and A represents two or more types of Ta, Nb, and Sb.

A method for producing a battery according to an aspect of the present disclosure includes preparing a mixture by mixing a plurality of types of raw materials containing elements constituting a lithium composite metal oxide represented by the following compositional formula, forming a first molded body using an active material, forming a composite body including the first molded body and an electrolyte portion containing a crystalline electrolyte by performing a first heating treatment and a second heating treatment in a state where the mixture and the first molded body are brought into contact with each other, and forming a current collector for the composite body.

$Li_{7-x}La_3(Zr_{2-x}A_x)O_{12-y}F_y$

In the formula, $0.1 \leq x \leq 1.0$, $0.0 < y \leq 1.0$, and A represents two or more types of Ta, Nb, and Sb.

A method for producing a battery according to an aspect of the present disclosure includes preparing a mixture by mixing a plurality of types of raw materials containing elements constituting a lithium composite metal oxide represented by the following compositional formula, forming a calcined body by subjecting the mixture to a first heating treatment, forming a powder by grinding the calcined body, preparing a mixed body by mixing the powder with an active material, molding the mixed body, forming a composite body including the active material and an electrolyte portion containing a crystalline electrolyte by subjecting the molded mixed body to a second heating treatment, and forming a current collector for the composite body.

$Li_{7-x}La_3(Zr_{2-x}A_x)O_{12-y}F_y$

In the formula, $0.1 \leq x \leq 1.0$, $0.0 < y \leq 1.0$, and A represents two or more types of Ta, Nb, and Sb.

A method for producing a battery according to an aspect of the present disclosure includes preparing a first mixture by mixing a plurality of types of raw materials containing elements constituting a lithium composite metal oxide represented by the following compositional formula, forming a calcined body by subjecting the first mixture to a first heating treatment, preparing a second mixture by mixing the calcined body with a fluorine-containing inorganic compound, forming a fired body by subjecting the second mixture to a second heating treatment, forming a powder by grinding the fired body, preparing a mixed body by mixing the powder with an active material, molding the mixed body, forming a composite body including the active material and an electrolyte portion containing a crystalline electrolyte by subjecting the molded mixed body to a third heating treatment, and forming a current collector for the composite body.

$Li_{7-x}La_3(Zr_{2-x}A_x)O_{12}$

In the formula, $0.1 \leq x \leq 1.0$, and A represents two or more types of Ta, Nb, and Sb.

In the method for producing a battery, in the preparing the mixed body, a slurry as the mixed body including the powder, the active material, and a solvent may be prepared.

BRIEF DESCRIPTION OF THE DRAWINGS

FIG. 3 is a process flow diagram showing a method for producing a lithium-ion battery.

FIG. 4D is a schematic view showing the method for producing a lithium-ion battery.

FIG. 5 is a table showing compositions and firing conditions of electrolytes, etc. according to Examples and Comparative Examples.

FIG. 6 is a diagram showing X-ray diffraction charts of Example 2 and Comparative Example 2.

FIG. 7 is a table showing compositions and lithium ion conductivities of the electrolytes according to Examples and Comparative Examples.

FIG. 10 is a table showing electrolyte compositions of calcined bodies according to Examples and Comparative Examples.

FIG. 11 is a table showing compositions and lithium ion conductivities of the electrolytes according to Examples and Comparative Examples.

DESCRIPTION OF EXEMPLARY EMBODIMENTS

Hereinafter, embodiments of the present disclosure will be described with reference to the drawings. The embodiments described below describe examples of the present disclosure. The present disclosure is not limited to the following embodiments and various modifications made without changing the gist of the present disclosure are also included in the present disclosure. In the following respective drawings, in order to make each member have a recognizable size, the scale of each member is made different from the actual one.

1. First Embodiment 1.1. Battery

Figure 1:
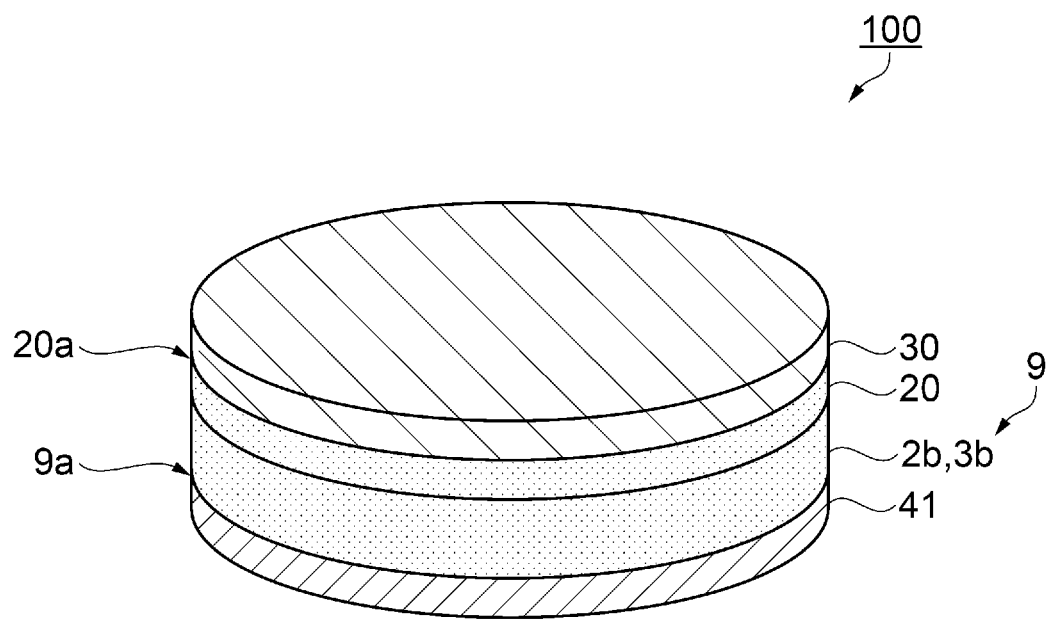
FIG. 1 is a schematic perspective view showing a configuration of a lithium-ion battery as a battery according to a first embodiment.

First, a battery according to this embodiment will be described with reference to FIG. 1. In this embodiment, an explanation will be given by showing a lithium-ion battery as an example of the battery. FIG. 1 is a schematic perspective view showing a configuration of a lithium-ion battery as the battery according to a first embodiment.

As shown in FIG. 1, a lithium-ion battery 100 of this embodiment includes a positive electrode 9 as a composite body including an electrolyte 3b and an active material 2b, a negative electrode 30 as an electrode provided, via an electrolyte layer 20, at one face of the positive electrode 9, and a first current collector 41 as a current collector provided in contact with another face opposite to the one face of the positive electrode 9.

That is, the lithium-ion battery 100 is a stacked body in which the first current collector 41, the positive electrode 9, the electrolyte layer 20, and the negative electrode 30 are sequentially stacked. In the electrolyte layer 20, a face in contact with the negative electrode 30 is defined as "one face 20a", and in the positive electrode 9, a face in contact with the first current collector 41 is defined as "surface 9a". For the negative electrode 30, a second current collector (not shown) may be provided as appropriate.

1.1.1. Current Collector

For the first current collector 41 and the second current collector, any forming material can be suitably used as long as it does not cause an electrochemical reaction with the positive electrode 9 and the negative electrode 30, and has an electron conduction property. Examples of the forming material of the first current collector 41 and the second current collector include one type of metal simple substance selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), alloys containing one or more types of metal elements selected from the above-mentioned group, electrically conductive metal oxides such as ITO (Tin-doped Indium Oxide), ATO (Antimony-doped Tin Oxide), and FTO (Fluorine-doped Tin Oxide), and metal nitrides such as titanium nitride (TiN), zirconium nitride (ZrN), and tantalum nitride (TaN).

As the form of the first current collector 41 and the second current collector, other than a thin film of the above-mentioned forming material having an electron conduction property, an appropriate form such as a metal foil, a plate shape, a mesh-like shape, a lattice-like shape, or a paste obtained by kneading an electrically conductive fine powder together with a binder can be selected according to the intended purpose. The thickness of such a first current collector 41 and a second current collector is not particularly limited, but is, for example, about 20 μm. The formation of the first current collector 41 and the second current collector may be performed after forming the positive electrode 9, the negative electrode 30, and the like, or may be performed before forming such members.

1.1.2. Negative Electrode

Examples of a negative electrode active material contained in the negative electrode 30, that is, a forming material of the negative electrode 30 include niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), ITO, ATO, FTO, aluminum (Al)-doped zinc oxide (AZO), gallium (Ga)-doped zinc oxide (GZO), an anatase phase of $TiO_2$, lithium composite oxides such as $Li_4Ti_5O_{12}$ and $Li_2Ti_3O_7$, metals and alloys such as lithium (Li), silicon (Si), tin (Sn), a silicon-manganese alloy (Si—Mn), a silicon-cobalt alloy (Si—Co), a silicon-nickel alloy (Si—Ni), indium (In), and gold (Au), a carbon material, and a material obtained by intercalation of lithium ions between layers of a carbon material. In this embodiment, metallic lithium (Li) is used as the negative electrode 30.

The thickness of the negative electrode 30 is preferably approximately about 50 nm to 100 μm, but can be arbitrarily designed according to a desired battery capacity or material properties.

The lithium-ion battery 100 has, for example, a circular disk shape, and the contour size thereof is such that the diameter is about 10 mm and the thickness is about 150 μm. In addition to being small and thin, the lithium-ion battery 100 can be charged and discharged, and is capable of obtaining a large output energy, and therefore can be suitably used as a power supply source, that is, a power supply for a portable information terminal or the like. The shape of the lithium-ion battery 100 is not limited to a circular disk shape, and may be, for example, a polygonal disk shape. Such a thin lithium-ion battery 100 may be used alone or a plurality of lithium-ion batteries 100 may be stacked and used. When the lithium batteries 100 are stacked, the first current collector 41 and the second current collector are not necessarily essential components, and a configuration in which one of the current collectors is included may be adopted.

Figure 2:
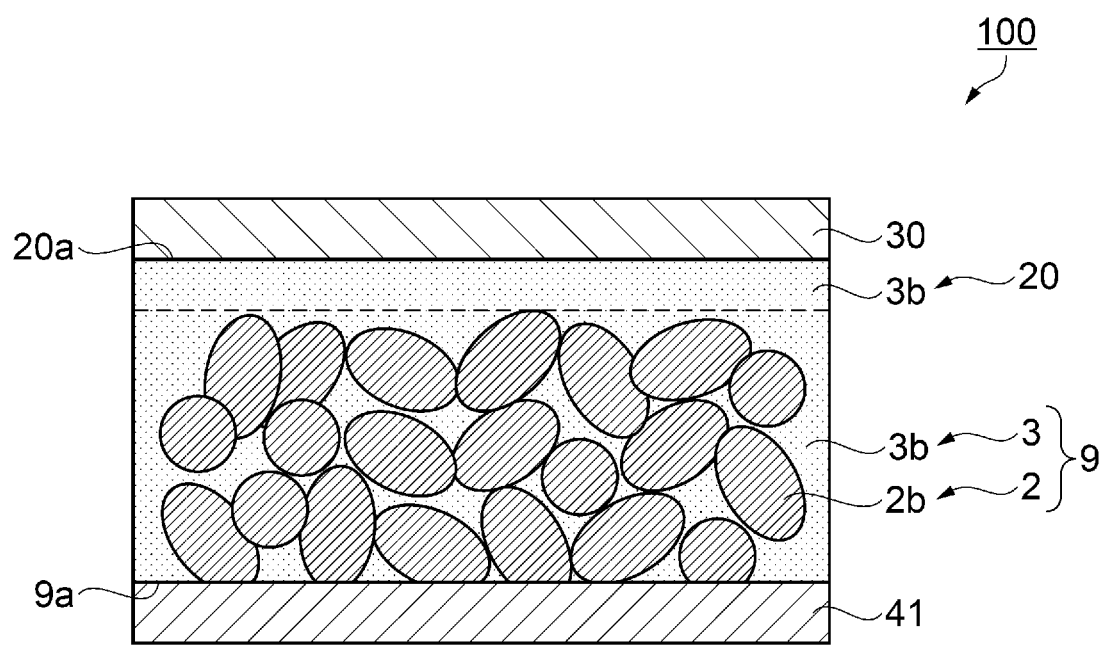
FIG. 2 is a schematic cross-sectional view showing a structure of the lithium-ion battery.

Next, the structures of the positive electrode 9, the electrolyte layer 20, and the like included in the lithium-ion battery 100 will be described with reference to FIG. 2. FIG. 2 is a schematic cross-sectional view showing the structure of the lithium-ion battery.

As shown in FIG. 2, the electrolyte layer 20 includes the electrolyte 3b, and the positive electrode 9 includes the active material 2b and the electrolyte 3b. The active material 2b is in a particle form, and a plurality of particles of the active material 2b gather to form an active material portion 2 having a plurality of pores formed therein. That is, the active material portion 2 is a porous material in a single state.

1.1.3. Positive Electrode

The positive electrode 9 includes the active material portion 2 and the electrolyte portion 3. The plurality of pores of the active material portion 2 in the positive electrode 9 communicate with one another in a mesh form inside the active material portion 2. Further, by the contact between the active materials 2b, an electron conduction property of the active material portion 2 is ensured. The electrolyte 3b is included in the electrolyte portion 3, and the electrolyte portion 3 is provided so as to fill up the plurality of pores of the active material portion 2 and further cover the entire active material portion 2. That is, the active material portion 2 and the electrolyte portion 3 are combined to form the positive electrode 9 as a composite body. Therefore, as compared with a case where the active material portion 2 does not have a plurality of pores or a case where the electrolyte portion 3 is not provided up to the inside of the pores, the contact area between the active material 2b and the electrolyte 3b becomes large. Due to this, the interfacial resistance is decreased, and it becomes possible to achieve favorable charge transfer at an interface between the active material portion 2 and the electrolyte portion 3.

As in the lithium-ion battery 100 of this embodiment, when the first current collector 41 is used at a positive electrode 9 side, a lithium composite metal compound that is a positive electrode active material containing lithium (Li) is used as the active material 2b. FIG. 2 is a view schematically showing the active materials 2b, and the actual particle diameters and sizes of the respective active materials 2b are not necessarily the same.

The lithium composite metal compound to be used as the positive electrode active material refers to a compound such as an oxide, which contains lithium (Li) and also contains two or more types of metal elements as a whole, and in which the existence of oxoacid ions is not observed.

Examples of the lithium composite metal compound include composite metal compounds containing lithium (Li) and also containing one or more types of elements selected from vanadium (V), chromium (Cr), manganese (Mn), iron (Fe), cobalt (Co), nickel (Ni), and copper (Cu). Such a composite metal compound is not particularly limited, however, specific examples thereof include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, NMC ($Li_a(Ni_xMn_yCo_{1-x-y})O_2$), and NCA ($Li(Ni_xCo_yAl_{1-x-y})O_2$). Further, solid solutions obtained by substituting some of the atoms in a crystal of any of these lithium composite metal compounds with another transition metal, a typical metal, an alkali metal, an alkaline rare earth metal, a lanthanoid, a chalcogenide, a halogen, or the like are also included in the lithium composite metal compound, and any of these solid solutions can also be used as the positive electrode active material. In this embodiment, as the active material 2b, a lithium composite metal oxide containing lithium (Li) and oxygen (O) among the above-mentioned lithium composite metal compounds is used.

By using the lithium composite metal compound as the active material 2b in the forming material of the active material portion 2, electron transfer is carried out between the particles of the active material 2b, and lithium ion transfer is carried out between the active material 2b and the electrolyte 3b. According to this, the function as the active material portion 2 can be favorably exhibited.

The bulk density of the active material portion 2 is preferably 50% or more and 90% or less, more preferably 50% or more and 70% or less. When the active material portion 2 has such a bulk density, the surface area of the active material portion 2 is enlarged, so that it becomes easy to increase the contact area between the active material portion 2 and the electrolyte portion 3. According to this, in the lithium-ion battery 100, it becomes easier to increase the capacity than in the related art.

When the above-mentioned bulk density is denoted by β (%), the contour volume of the active material portion 2, that is, the apparent volume of the active material portion 2 is denoted by v, the mass of the active material portion 2 is denoted by w, and the density of the particles of the active material 2b is denoted by ρ, the following mathematical formula (a) is established. According to this, the bulk density can be determined.

$$\beta = \{w/(v \cdot \rho)\} \times 100 \tag{a}$$

In order to control the bulk density of the active material portion 2 to fall within the above range, the average particle diameter, that is, the median diameter of the active material 2b is preferably set to 0.3 μm or more and 10 μm or less, and is more preferably 0.5 μm or more and 5 μm or less. The average particle diameter of the active material 2b can be measured by, for example, dispersing the active material 2b in n-octyl alcohol at a concentration within a range of 0.1 mass % or more and 10 mass % or less, and determining the median diameter using a light scattering particle size distribution analyzer, Nanotrac (trademark) UPA-EX250 of MicrotracBEL Corporation.

The bulk density of the active material portion 2 may also be controlled by using a pore forming material in a step of forming the active material portion 2.

The resistivity of the active material portion 2 is preferably 700 Ω·cm or less. When the active material portion 2 has such a resistivity, a sufficient output can be obtained in the lithium-ion battery 100. The resistivity can be determined by adhering a copper foil as an electrode to the surface of the active material portion 2, and performing DC polarization measurement.

In the active material portion 2, the plurality of pores communicate with one another in a mesh form inside, and also the active material portions 2 are coupled to one another to form a mesh-like structure. For example, $LiCoO_2$ as a lithium composite metal oxide that is a positive electrode active material is known to have anisotropy in the electron conduction property in a crystal. Therefore, in a structure in which the pores extend in a specific direction such that the pores are formed by machining, the electron conduction property may be decreased depending on the direction of the electron conduction property in a crystal. On the other hand, in this embodiment, the active material portion 2 has a mesh-like structure, and therefore, an electrochemically active continuous surface can be formed regardless of the anisotropy in the electron conduction property or ion conduction property in a crystal. Due to this, a favorable electron conduction property can be ensured regardless of the type of the forming material to be used.

In the positive electrode 9, the contained amount of a binder as a binding agent for binding the active materials 2b to one another or the pore forming material for adjusting the bulk density of the active material portion 2 is preferably reduced as much as possible. When the binder or the pore forming material remains in the positive electrode 9, such a component may sometimes adversely affect the electrical characteristics, and therefore, it is necessary to remove the component by carefully performing heating in a post-process. Specifically, in this embodiment, a mass loss percentage when the positive electrode 9 is heated to 400° C. for 30 minutes is set to 5 mass % or less. The mass loss percentage is preferably 3 mass % or less, more preferably 1 mass % or less, and further more preferably, the mass loss is not observed or is within the measurement error range. When the positive electrode 9 has such a mass loss percentage, the amount of a solvent or adsorbed water to be evaporated, an organic substance to be vaporized by combustion or oxidation under a predetermined heating condition, or the like is reduced. According to this, the electrical characteristics, particularly charge-discharge characteristics of the lithium-ion battery 100 can be further improved.

The mass loss percentage of the positive electrode 9 can be determined from the values of the mass of the positive electrode 9 before and after heating under a predetermined heating condition using a thermogravimetric/differential thermal analyzer (TG-DTA).

In the lithium-ion battery 100, when an upper side in FIG. 2 is defined as upward direction, a surface at an upper side of the positive electrode 9 is in contact with the electrolyte layer 20. The surface 9a at a lower side of the positive electrode 9 is in contact with the first current collector 41. In the positive electrode 9, the upper side in contact with the electrolyte layer 20 is one face, and the lower side in contact with the first current collector 41 is the other face, that is, the surface 9a.

At the surface 9a of the positive electrode 9, the active material portion 2 is exposed. Therefore, the active material portion 2 and the first current collector 41 are provided in contact with each other and both are electrically coupled to each other. The electrolyte portion 3 is provided up to the inside of the pores of the active material portion 2 and is in contact with the surface of the active material portion 2 including the inside of the pores of the active material portion 2 other than the face in contact with the first current collector 41. In the positive electrode 9 having such a configuration, the contact area between the active material portion 2 and the electrolyte portion 3 becomes larger than the contact area between the first current collector 41 and the active material portion 2. Due to this, an interface between the active material portion 2 and the electrolyte portion 3 hardly becomes a bottleneck of charge transfer, and therefore, favorable charge transfer is easily ensured as the positive electrode 9, and thus, it is possible to achieve high capacity and high output in the lithium-ion battery 100 including the positive electrode 9.

1.1.4. Electrolyte

Next, the configuration of the electrolyte 3b included in the positive electrode 9 as the electrolyte portion 3 will be described. The electrolyte 3b contains a lithium composite metal oxide represented by the following compositional formula (1). Here, the lithium composite metal oxide represented by the compositional formula (1) is also simply referred to as the lithium composite metal oxide of the compositional formula (1).

$$Li_{7-x}La_3(Zr_{2-x}A_x)O_{12-y}F_y \tag{1}$$

In the formula, 0.1≤x≤1.0, 0.0<y≤1.0, and A represents two or more types of Ta, Nb, and Sb.

In the electrolyte 3b, fluorine (F) having a relatively high electronegativity is introduced into a lithium composite metal oxide as shown in the compositional formula (1). Further, zirconium (Zr) is partially substituted with two or more types of tantalum (Ta), niobium (Nb), and antimony (Sb). The composition of such an electrolyte 3b can be confirmed by ICP-AES (Inductively Coupled Plasma-Atomic Emission Spectrometry).

In the electrolyte 3b, x in the compositional formula (1) is 0.1 or more, and therefore, the bulk lithium ion conductivity (grain bulk conductivity) in the electrolyte portion 3 can be improved. In addition, since x in the compositional formula (1) is 1.0 or less, generation of an impurity such as an oxide in the electrolyte portion 3 can be suppressed.

In the electrolyte 3b, y in the compositional formula (1) exceeds 0.0, and therefore, an effect of introduction of fluorine (F) such as acceleration of insertion and extraction of lithium ions or stabilization of a highly oxidized state of a transition metal such as lanthanum (La), tantalum (Ta), or niobium (Nb) is exhibited. In addition, since y in the compositional formula (1) is 1.0 or less, a decrease in the lithium ion conduction property due to excessive introduction of fluorine (F) can be suppressed.

The total ion conductivity as an index of the lithium ion conduction property of the electrolyte 3b is preferably 1.5×10⁻⁴ S/cm or more. When the electrolyte 3b has such an ion conductivity, an ion contained in the electrolyte portion 3 at a position away from the surface of the active material portion 2 easily reaches the surface of the active material portion 2. Due to this, also the ion can contribute to the battery reaction in the active material portion 2, and the capacity of the lithium-ion battery 100 can be further increased.

Here, the ion conductivity of the electrolyte 3b, in other words, the ion conductivity of the electrolyte portion 3 refers to a grain bulk conductivity as the conductivity of the electrolyte portion 3 itself, and in a case where the electrolyte 3b is a crystalline material, a grain boundary conductivity as the conductivity between crystal grains, and a total ion conductivity that is the sum of these conductivities. Further, an index of the grain boundary resistance in the electrolyte portion 3 is a grain boundary conductivity, and when the grain boundary conductivity is increased, the grain boundary resistance is decreased. A method for measuring the ion conductivity of the electrolyte portion 3 will be described later.

1.1.5. Electrolyte Layer

Going back to FIG. 2, the electrolyte layer 20 is provided between the positive electrode 9 and the negative electrode 30 as described above. The electrolyte layer 20 includes the same electrolyte 3b as that of the positive electrode 9, but does not include the active material 2b. By interposing the electrolyte layer 20 that does not include the active material 2b between the positive electrode 9 and the negative electrode 30, the positive electrode 9 and the negative electrode 30 are hardly electrically coupled to each other, and the occurrence of a short circuit is suppressed. The positive electrode 9 and the electrolyte layer 20 each include the electrolyte 3b, and therefore, the electrolyte 3b of both the positive electrode 9 and the electrolyte layer 20 may be formed simultaneously at the time of production. That is, in the production step of the lithium-ion battery 100, the formation of the active material portion 2 and the formation of the electrolyte layer 20 can be performed at a time. Further, the electrolyte layer 20 may be formed using a different forming material from that of the electrolyte 3b of the electrolyte portion 3. In such a case, the positive electrode 9 and the electrolyte layer 20 are formed in separate production steps.

The thickness of the electrolyte layer 20 is preferably 0.1 µm or more and 100 µm or less, more preferably 0.2 µm or more and 10 µm or less. By setting the thickness of the electrolyte layer 20 within the above range, the internal resistance of the electrolyte layer 20 is decreased, and the occurrence of a short circuit between the positive electrode 9 and the negative electrode 30 can be suppressed.

On the one face 20a of the electrolyte layer 20, a relief structure such as trenches, gratings, or pillars may be provided by combining various molding methods and processing methods as needed.

1.2. Method for Producing Battery

A method for producing the lithium-ion battery 100 as the battery according to this embodiment will be described with reference to FIGS. 3, 4A, 4B, 4C, and 4D. FIG. 3 is a process flow diagram showing the method for producing a lithium-ion battery. FIGS. 4A to 4D are each a schematic view showing the method for producing a lithium-ion battery. The process flow shown in FIG. 3 is an example, and the method is not limited thereto.

As shown in FIG. 3, the method for producing the lithium-ion battery 100 of this embodiment includes the following steps. In Step S1, a mixture is prepared by mixing a plurality of types of raw materials containing elements constituting a lithium composite metal oxide of the following compositional formula (1). In Step S2, an active material portion 2 as a first molded body is formed using an active material 2b. In Step S3, a positive electrode 9 as a composite body including the active material portion 2 and an electrolyte portion 3 containing a crystalline electrolyte 3b is formed by performing a first heating treatment and a second heating treatment in a state where the mixture and the active material portion 2 are brought into contact with each other. In this embodiment, an electrolyte layer 20 is also formed together with the formation of the positive electrode 9. In Step S4, a negative electrode 30 is formed, via the electrolyte layer 20, at one face of the positive electrode 9. In Step S5, a first current collector 41 is formed at another surface 9a of the positive electrode 9.

$$Li_{7-x}La_3(Zr_{2-x}A_x)O_{12-y}F_y \qquad (1)$$

In the formula, $0.1 \leq x \leq 1.0$, $0.0 < y \leq 1.0$, and A represents two or more types of Ta, Nb, and Sb.

Here, in the method for producing the lithium-ion battery 100, a method for producing the electrolyte 3b of this embodiment is included. That is, the method for producing the electrolyte 3b of this embodiment includes a step of preparing a mixture by mixing a plurality of types of raw materials containing elements constituting a lithium composite metal oxide of the compositional formula (1), a step of forming a calcined body by subjecting the mixture to a first heating treatment, and a step of forming a crystalline electrolyte 3b by subjecting the calcined body to a second heating treatment.

These steps included in the method for producing the electrolyte 3b are included in Step S1 and Step S3 in the method for producing the lithium-ion battery 100 described above. In this embodiment, an explanation will be given by showing a method for producing the electrolyte 3b using a liquid phase method as an example, but the method is not limited thereto. For example, a plurality of types of raw materials containing elements constituting a lithium composite metal oxide of the compositional formula (1) are mixed in a powder form, and the resulting mixture may be filled in the active material portion 2.

1.2.1. Preparation of Mixture

In Step S1, a mixture in a liquid state is prepared by dissolving precursors as the raw materials of the electrolyte 3b in a solvent to prepare solutions, followed by mixing these solutions. That is, the mixture contains a solvent for dissolving the above-mentioned raw materials. As the raw materials, compounds containing the elements constituting the lithium composite metal oxide of the compositional formula (1) are used.

As the compounds containing the elements constituting the lithium composite metal oxide of the compositional formula (1), metal compounds of a lithium compound, a lanthanum compound, a zirconium compound, a tantalum compound, a niobium compound, and an antimony compound, and a fluorine-containing compound are used. Hereinafter, the compounds containing the elements constituting the lithium composite metal oxide of the compositional formula (1) are also referred to as the precursors of the electrolyte 3b. The types of the metal compounds are not particularly limited, but each compound is preferably one or more types of metal salts or metal alkoxides of lithium, lanthanum, zirconium, tantalum, niobium, or antimony. Here, in the mixture, two or more types of a tantalum compound, a niobium compound, and an antimony compound are used.

Examples of the lithium compound include lithium metal salts such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium n-butoxide, lithium isobutoxide, lithium sec-butoxide, lithium tert-butoxide, and lithium dipivaloylmethanate, and one or more types in this group can be adopted.

Examples of the lanthanum compound include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-sec-butoxide, lanthanum tri-tert-butoxide, and lanthanum tris(dipivaloylmethanate), and one or more types in this group can be adopted.

Examples of the zirconium compound include zirconium metal salts such as zirconium chloride, zirconium oxychloride, zirconium oxynitrate, zirconium oxyacetate, and zirconium acetate, and zirconium alkoxides such as zirconium tetram ethoxide, zirconium tetraethoxide, zirconium tetrapropoxide, zirconium tetraisopropoxide, zirconium tetra-n-butoxide, zirconium tetraisobutoxide, zirconium tetra-sec-butoxide, zirconium tetra-tert-butoxide, and zirconium tetrakis(dipivaloylmethanate), and one or more types in this group can be adopted.

Examples of the tantalum compound include tantalum metal salts such as tantalum chloride and tantalum bromide, and tantalum alkoxides such as tantalum pentamethoxide, tantalum pentaethoxide, tantalum pentaisopropoxide, tantalum penta-n-propoxide, tantalum pentai sobutoxide, tantalum penta-n-butoxide, tantalum penta-sec-butoxide, and tantalum penta-tert-butoxide, and one or more types in this group can be adopted.

Examples of the niobium compound include niobium metal salts such as niobium chloride, niobium oxychloride, niobium oxalate, niobium triacetylacetonate, and niobium pentaacetylacetonate, and niobium alkoxides such as niobium pentaethoxide, niobium pentapropoxide, niobium pentaisopropoxide, and niobium penta-sec-butoxide, and one or more types in this group can be adopted.

Examples of the antimony compound include antimony metal salts such as antimony bromide and antimony chloride, and antimony alkoxides such as antimony trimethoxide, antimony triethoxide, antimony triisopropoxide, antimony tri-n-propoxide, antimony triisobutoxide, and antimony tri-n-butoxide, and one or more types in this group can be adopted.

As the fluorine-containing compound, a fluorine-containing polymer compound or a fluorine-containing inorganic compound can be adopted. Examples of the fluorine-containing polymer compound include polyvinylidene fluoride (PVDF) and polytetrafluoroethylene (PTFE). Examples of the fluorine-containing inorganic compound include lithium fluoride (LiF), lanthanum fluoride (LaF$_3$), zirconium tetrafluoride (ZrF$_4$), antimony trifluoride (SbF$_3$), and antimony pentafluoride (SbF$_5$).

As the solvent contained in the mixture in a liquid state, a single solvent of water or an organic solvent or a mixed solvent thereof capable of dissolving the above-mentioned metal compounds and fluorine-containing compounds is used. The organic solvent is not particularly limited, however, examples thereof include alcohols such as methyl alcohol, ethyl alcohol, n-propyl alcohol, isopropyl alcohol, n-butyl alcohol, allyl alcohol, and ethylene glycol monobutyl ether (2-butoxyethanol), glycols such as ethylene glycol, propylene glycol, butylene glycol, hexylene glycol, pentanediol, hexanediol, heptanediol, and dipropylene glycol, ketones such as dimethyl ketone, methyl ethyl ketone (2-butanone), methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, 2-ethylbutyric acid, and propionic acid, aromatics such as toluene, o-xylene, and p-xylene, and amides such as formamide, N,N-dimethylformamide, N,N-diethylformamide, dimethylacetamide, and N-methylpyrrolidone. When the fluorine-containing inorganic compound such as lithium fluoride is adopted, such a compound may be used as an emulsion obtained by dispersing the compound in the above-mentioned solvent without forming a solution by dissolving the compound. In addition, a mixture in a liquid state may be prepared by mixing and dispersing the fluorine-containing inorganic compound in a powder form in a solution containing the precursors of the electrolyte $3b$ other than the fluorine-containing inorganic compound.

A plurality of solutions containing the precursors of the electrolyte $3b$ are prepared by dissolving the precursors of the electrolyte $3b$ in any of the above-mentioned solvents. Subsequently, a mixture is prepared by mixing the plurality of solutions. At this time, lithium, lanthanum, zirconium, fluorine, and two or more types of tantalum, niobium, and antimony, and a fluorine-containing compound are incorporated in the mixture in a predetermined ratio according to the composition of the electrolyte $3b$. At this time, the mixture may be prepared by mixing all the precursors of the electrolyte $3b$, and then dissolving the mixed precursors in a solvent without preparing the plurality of solutions each containing each of the precursors of the electrolyte $3b$.

Lithium (Li) in the composition is sometimes volatilized by heating in a post-process. Therefore, the lithium compound may be blended excessively in advance so that the content of the lithium compound in the mixture is about 1.05 times to 1.30 times in molar ratio with respect to the desired composition according to the heating condition.

Figure 4A:
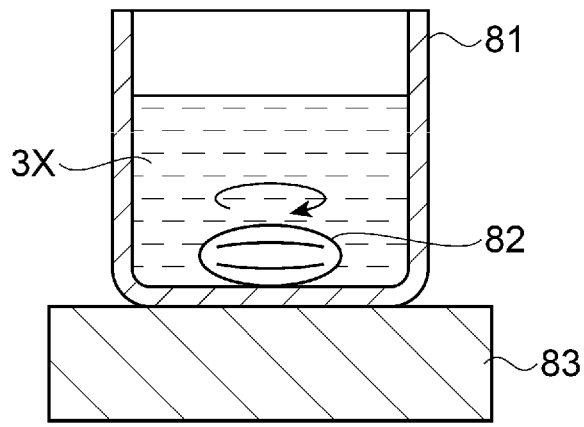
FIG. 4A is a schematic view showing the method for producing a lithium-ion battery.

In the preparation of the mixture, specifically, for example, as shown in FIG. 4A, the plurality of solutions each containing each of the precursors of the electrolyte $3b$ are placed in a beaker 81 made of Pyrex. A magnetic stirrer bar 82 is placed therein, and the solutions are mixed while stirring using a magnetic stirrer 83. By doing this, a mixture $3\times$ in a liquid state is obtained. Then, the process proceeds to Step S2.

1.2.2. Formation of First Molded Body

In Step S2, the active material portion 2 as the first molded body is formed. In this embodiment, as the active material $2b$ that is the forming material of the active material portion 2, lithium cobalt oxide (LiCoO$_2$) being a lithium composite metal oxide is used. First, LiCoO$_2$ particles of Sigma-Aldrich Co., Ltd. are subjected to a classification operation in n-butanol (butanol) using a wet-type centrifuge model LC-1000 of Krettek Separation GmbH, whereby the active material $2b$ in a particle form having an average particle diameter of 5 μm is obtained.

Figure 4B:
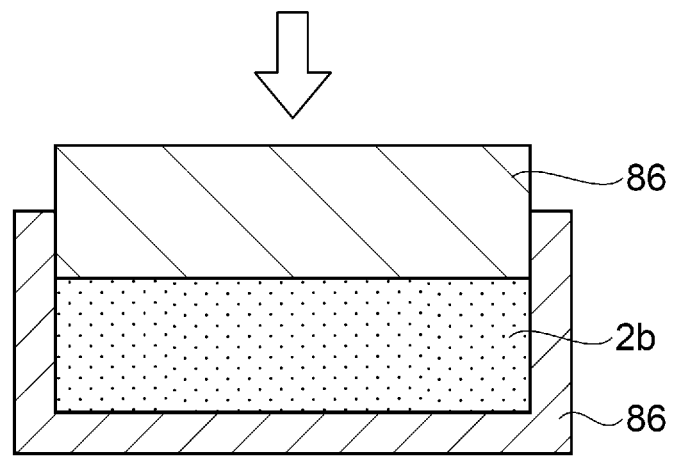
FIG. 4B is a schematic view showing the method for producing a lithium-ion battery.

Subsequently, by using a molding die 86 as shown in FIG. 4B, the active material $2b$ is compression molded. Specifically, by using a die with an exhaust port having an inner diameter of 10 mm as the molding die 86, a LiCoO$_2$ powder is pressed at a pressure of 0.624 kN/mm$^2$ (624 MPa) for 2 minutes, whereby a circular disk-shaped molded material of LiCoO$_2$ that is the active material $2b$ is prepared. The shape of the circular disk-shaped molded material is not particularly limited, but is set to, for example, 10 mm in diameter, 8 mm in effective diameter, and 150 μm in thickness.

Thereafter, the circular disk-shaped molded material of the active material $2b$ is placed on a substrate, and subjected to a heat treatment at 900° C. over 8 hours, whereby the active material portion 2 is obtained. By this heat treatment, the particles of the active material $2b$ are sintered to one another, and the shape of the active material portion 2 is easily maintained. Further, the active materials $2b$ are brought into contact with each other and bound to each other, whereby an electron transfer pathway is formed. A forming material of the substrate is not particularly limited, however, it is preferred to use a material that hardly reacts with the active material $2b$ or the electrolyte $3b$, and for example, magnesium oxide or the like is exemplified.

A temperature of the heat treatment is preferably, for example, 850° C. or higher and lower than the melting point of the active material $2b$. According to this, the particles of the active material $2b$ are sintered to one another, whereby the porous active material portion 2 in which the active materials $2b$ are integrated is obtained. By setting the temperature of the heat treatment to 850° C. or higher, sintering sufficiently proceeds, and also the electron conduction property in the crystal of the active material $2b$ is ensured. By setting the temperature of the heat treatment lower than the melting point of the active material $2b$, excessive volatilization of lithium ions in the crystal of the active material $2b$ is suppressed, and the lithium ion conduction property is maintained. Due to this, it becomes possible to ensure the electrical capacity of the positive electrode 9. The temperature of the heat treatment is more preferably 875° C. or higher and 1000° C. or lower. According to this, to the lithium-ion battery 100 including the positive electrode 9, appropriate output and capacity can be provided.

A time of the heat treatment is preferably set to, for example, 5 minutes or more and 36 hours or less, and is more preferably 4 hours or more and 14 hours or less. By the above-mentioned treatment, the porous active material portion 2 having a plurality of pores is obtained. Here, in this embodiment, as a method for forming the active material portion 2 as the first molded body, a method in which a powder of the active material $2b$ is compression molded is exemplified, however, the method is not limited thereto. For example, the active material portion 2 may be molded by a green sheet method by preparing a slurry of the active material $2b$ using a solvent to be used for the mixture in a liquid state or the like. After molding into a sheet form by a green sheet method, the solvent is volatilized, and thereafter, the resulting material is processed into a desired shape, and then, the same heat treatment as described above may be performed. Then, the process proceeds to Step S3.

1.2.3. Formation of Composite Body

In Step S3, the mixture $3\times$ prepared in Step S1 is brought into contact with the active material portion 2 and impregnated thereinto, and then, a first heating treatment and a second heating treatment are performed, whereby the crystalline electrolyte $3b$ is produced from the mixture $3\times$. In this manner, the electrolyte portion 3 containing the electrolyte $3b$ is formed at the surface including the inside of the pores of the active material portion 2, whereby the positive electrode 9 as the composite body is obtained.

Figure 4C:
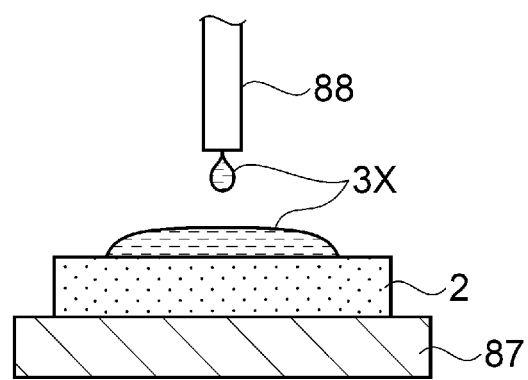
FIG. 4C is a schematic view showing the method for producing a lithium-ion battery.

First, the mixture $3\times$ and the active material portion 2 are brought into contact with each other so that the mixture $3\times$ is impregnated into the active material portion 2. Specifically, as shown in FIG. 4C, the active material portion 2 is placed on a substrate 87. The substrate 87 is made of, for example, magnesium oxide.

Subsequently, the mixture 3× is applied to the surface of the active material portion 2 including the inside of the pores of the active material portion 2 using a micropipette 88 or the like. As a method for applying the mixture 3×, other than dropping using the micropipette 88, for example, a method such as immersion, spraying, penetration by capillary phenomenon, or spin coating can be used, and these methods may be performed in combination. The mixture 3× has fluidity, and therefore also easily reaches the inside of the pores of the active material portion 2 by capillary phenomenon. At this time, the mixture 3× is applied so as to wet and spread on the entire surface including the inside of the pores of the active material portion 2.

Here, when the electrolyte layer 20 is formed from the same forming material as that of the electrolyte portion 3, the mixture 3× is excessively applied to one face of the active material portion 2. By performing the below-mentioned heating treatment in this state, the active material portion 2 is completely sunk in the electrolyte portion 3, and the electrolyte layer 20 is formed. In this embodiment, the positive electrode 9 and the electrolyte layer 20 are formed at a time by the above-mentioned method.

Subsequently, the mixture 3× impregnated into the active material portion 2 is subjected to a heating treatment. The heating treatment includes a first heating treatment at a heating temperature of 500° C. or higher and 650° C. or lower, and a second heating treatment at a heating temperature of 800° C. or higher and 1000° C. or lower that is performed after the first heating treatment. Specifically, as shown in FIG. 4D, the active material portion 2 impregnated with the mixture 3× is placed, via a support 89, in a crucible 90 with a lid. Thereafter, the active material portion 2 together with the crucible 90 is placed in an electric muffle furnace and subjected to the first heating treatment and the second heating treatment. The crucible 90 is made of, for example, magnesium oxide. The heating treatment may be performed in a dry atmosphere or an oxidizing atmosphere.

A time of the first heating treatment is not particularly limited, but is, for example, 30 minutes or more and 2 hours or less. A time of the second heating treatment is not particularly limited, but is, for example, 2 hours or more and 36 hours or less.

By the first heating treatment, the solvent or an organic substance such as an impurity contained in the mixture 3× is decomposed and reduced, and also the mixture 3× is converted into a calcined body. By subjecting the calcined body to the second heating treatment, the purity is increased to accelerate the reaction, and the electrolyte portion 3 containing the electrolyte 3b can be formed. Further, by setting the temperature of the heating treatment to 1000° C. or lower, the occurrence of a side reaction at a crystal grain boundary or volatilization of lithium can be suppressed. Accordingly, the lithium ion conduction property can be further improved.

The reaction in the mixture 3× proceeds by the heating treatment, whereby the electrolyte portion 3 containing the crystalline electrolyte 3b is formed. Subsequently, the mixture is gradually cooled to room temperature after the heating treatment.

Accordingly, the positive electrode 9 in which the active material portion 2 and the electrolyte portion 3 are combined is obtained. Further, as described above, the electrolyte layer 20 is formed at one face of the positive electrode 9. Here, the bulk density of the positive electrode 9 is set to about 90% or more and 100% or less. When the bulk density of the positive electrode 9 is less than 90%, Step S3 is repeatedly performed until the bulk density reaches 90% or more. The bulk density of the positive electrode 9 is calculated using the above-mentioned mathematical formula (a). Specifically, the bulk density of the positive electrode 9 can be determined in the same manner as the bulk density of the active material portion 2 from the apparent volume (v) of the positive electrode 9, the mass (w) of the positive electrode 9, and the average density ($\rho$) of the active material 2b and the electrolyte 3b constituting the positive electrode 9. Then, the process proceeds to Step S4.

1.2.4. Formation of Negative Electrode

In Step S4, the negative electrode 30 is formed, via the electrolyte layer 20, at one face side of the positive electrode 9, in other words, at the one face 20a of the electrolyte layer 20. As a method for forming the negative electrode 30, other than a solution process such as a so-called sol-gel method or an organometallic thermal decomposition method involving a hydrolysis reaction or the like of an organometallic compound, a CVD (Chemical Vapor Deposition) method using an appropriate metal compound and an appropriate gas atmosphere, an ALD (Atomic Layer Deposition) method, a green sheet method or a screen printing method using a slurry of electrolyte particles, an aerosol deposition method, a sputtering method using an appropriate target and an appropriate gas atmosphere, a PLD (Pulsed Laser Deposition) method, a vacuum vapor deposition method, plating, thermal spraying, or the like can be used. As a forming material of the negative electrode 30, the above-mentioned negative electrode active material can be adopted, and in this embodiment, metallic lithium (Li) is used. Then, the process proceeds to Step S5.

1.2.5. Formation of First Current Collector

In Step S5, first, a face opposed to a face where the electrolyte layer 20 is formed of the positive electrode 9, that is, the positive electrode 9 at a lower face side is polished. At this time, by a polishing process, the active material portion 2 is reliably exposed to form the surface 9a. By doing this, electrical coupling between the active material portion 2 and the first current collector 41 to be formed thereafter can be ensured. When the active material portion 2 is sufficiently exposed at the lower face side of the positive electrode 9 in the above-mentioned step, this polishing process may be omitted.

Subsequently, the first current collector 41 is formed at the surface 9a. Examples of a method for forming the first current collector 41 include a method in which an appropriate adhesive layer is separately provided to achieve adhesion, a gas phase deposition method such as a PVD (Physical Vapor Deposition) method, a CVD method, a PLD method, an ALD method, and an aerosol deposition method, and a wet method such as a sol-gel method, an organometallic thermal decomposition method, and plating, and an appropriate method can be used according to the reactivity with the face where the first current collector 41 is formed, an electrical conduction property desired for the electrical circuit, and the design of the electrical circuit. Further, as a forming material of the first current collector 41, the above-mentioned forming material can be adopted. By undergoing the above-mentioned steps, the lithium-ion battery 100 is produced.

As described above, by the electrolyte 3b, the method for producing the electrolyte 3b, the lithium-ion battery 100, and the method for producing the lithium-ion battery 100 according to the first embodiment, the following effects can be obtained.

According to the electrolyte 3b, even if firing is performed at 1000° C. or lower that is a relatively low temperature for the firing temperature, the grain boundary resistance of crystal grains is decreased and also the lithium ion conduction property can be improved. For details, fluorine (F) having a relatively high electronegativity is introduced into the lithium composite metal oxide of the compositional formula (1). Therefore, insertion and extraction of lithium ions in the electrolyte 3b are accelerated and also a highly oxidized state of a transition metal such as lanthanum (La), tantalum (Ta), or niobium (Nb) is stabilized. As a result, the electrochemical property and thermochemical property of the electrolyte 3b are improved and the grain boundary resistance is decreased, and also the lithium ion conduction property is improved. In addition, since zirconium (Zr) is partially substituted with two or more types of tantalum (Ta), niobium (Nb), and antimony (Sb), the lithium ion conduction property is further improved as compared with a case where zirconium is not partially substituted with such an element. Accordingly, even if firing is performed at a low temperature of 1000° C. or lower, the electrolyte 3b in which the grain boundary resistance is decreased as compared with the related art and the lithium ion conduction property is improved can be provided.

According to the lithium-ion battery 100, the electrolyte 3b in which the grain boundary resistance is decreased and the lithium ion conduction property is improved is used, and therefore, the charge-discharge characteristics can be improved.

Since $LiCoO_2$ containing lithium (Li) and oxygen (O) to serve as a lithium supply source is used as the positive electrode active material, the charge-discharge characteristics can be further improved. In addition, the capacity of the lithium-ion battery 100 can be increased as compared with the related art.

Since the negative electrode 30 is formed from metallic lithium (Li), the lithium supply source is increased so that the capacity of the lithium-ion battery 100 can be increased as compared with a case where the negative electrode 30 is constituted by a material other than metallic lithium (Li).

The lithium composite metal oxide of the compositional formula (1) can be produced from the mixture 3x in which a fluorine-containing polymer compound or a fluorine-containing inorganic compound is mixed as the raw material containing fluorine (F). That is, the electrolyte 3b and the lithium-ion battery 100 in which the grain boundary resistance is decreased as compared with the related art and the lithium ion conduction property is improved can be produced.

Since the electrolyte 3b contains the lithium composite metal oxide of the compositional formula (1), the time of the second heating treatment in the production step, that is, the firing time can be reduced as compared with a case where the electrolyte 3b does not contain the lithium composite metal oxide of the compositional formula (1).

Since the mixture 3x in a liquid state is prepared in the step of preparing the mixture 3x, it becomes easy to handle the mixture 3x as compared with a case where the mixture 3x is a powder. Further, it becomes easy to apply the mixture 3x to the surface including the inside of the pores of the active material portion 2 when the positive electrode 9 is formed.

By the first heating treatment, the solvent or an organic substance such as an impurity in the mixture 3x is decomposed and reduced. Therefore, in the second heating treatment, the crystalline electrolyte 3b can be formed while increasing the purity. In addition, by setting the temperature in the first heating treatment and the second heating treatment to 1000° C. or lower, the occurrence of a side reaction at a crystal grain boundary or volatilization of lithium can be suppressed. Accordingly, the electrolyte 3b having a further improved lithium ion conduction property can be produced.

1.3. Examples and Comparative Examples

Next, the effects of the first embodiment will be more specifically described by showing Examples and Comparative Examples with respect to the electrolyte 3b of the first embodiment. FIG. 5 is a table showing the compositions and firing conditions of the electrolytes, etc. according to Examples and Comparative Examples. The weighing in the experiment in this specification was performed up to 0.1 mg units using an analytical balance ME204T of Mettler Toledo International, Inc.

1.3.1. Preparation of Solutions Containing Precursors of Electrolyte

First, by using a lithium compound, a lanthanum compound, a zirconium compound, an antimony compound, a tantalum compound, a niobium compound, a fluorine-containing compound, and a solvent, the following solutions each containing each of the compounds as precursors of an electrolyte were prepared. Note that the fluorine-containing inorganic compound is added without preparing a solution as described above.

1.3.1.1. 2-Butoxyethanol Solution of 1 mol/kg Lithium Nitrate

In a 30-g reagent bottle made of Pyrex (trademark of Corning Incorporated) equipped with a magnetic stirrer bar, 1.3789 g of lithium nitrate with a purity of 99.95%, 3N5, of Kanto Chemical Co., Inc. and 18.6211 g of 2-butoxyethanol (ethylene glycol monobutyl ether) Cica Special Grade of Kanto Chemical Co., Inc. were weighed. Then, the bottle was placed on a magnetic stirrer with a hot plate function, and lithium nitrate was completely dissolved in 2-butoxyethanol while stirring at 190° C. for 1 hour, followed by gradual cooling to about 20° C., whereby a 2-butoxyethanol solution of 1 mol/kg lithium nitrate was obtained. The purity of lithium nitrate can be measured using an ion chromatography-mass spectrometer.

1.3.1.2. 2-Butoxyethanol Solution of 1 mol/kg Lanthanum Nitrate Hexahydrate

In a 30-g reagent bottle made of Pyrex equipped with a magnetic stirrer bar, 8.6608 g of lanthanum nitrate hexahydrate, 4N, of Kanto Chemical Co., Inc. and 11.3392 g of 2-butoxyethanol were weighed. Then, the bottle was placed on a magnetic stirrer with a hot plate function, and lanthanum nitrate hexahydrate was completely dissolved in 2-butoxyethanol while stirring at 140° C. for 30 minutes, followed by gradual cooling to about 20° C., whereby a 2-butoxyethanol solution of 1 mol/kg lanthanum nitrate hexahydrate was obtained.

1.3.1.3. Butanol Solution of 1 mol/kg Zirconium Tetra-n-Butoxide

In a 20-g reagent bottle made of Pyrex equipped with a magnetic stirrer bar, 3.8368 g of zirconium tetra-n-butoxide of Wako Pure Chemical Industries, Ltd. and 6.1632 g of butanol (n-butanol) were weighed. Then, the bottle was placed on a magnetic stirrer, and zirconium tetra-n-butoxide was completely dissolved in butanol while stirring at about 20° C. for 30 minutes, whereby a butanol solution of 1 mol/kg zirconium tetra-n-butoxide was obtained.

1.3.1.4. 2-Butoxyethanol Solution of 1 mol/kg Antimony tri-n-Butoxide

In a 20-g reagent bottle made of Pyrex equipped with a magnetic stirrer bar, 3.4110 g of antimony tri-n-butoxide of Wako Pure Chemical Industries, Ltd. and 6.5890 g of 2-butoxyethanol were weighed. Then, the bottle was placed on a magnetic stirrer, and antimony tri-n-butoxide was completely dissolved in 2-butoxyethanol while stirring at about 20° C. for 30 minutes, whereby a 2-butoxyethanol solution of 1 mol/kg antimony tri-n-butoxide was obtained.

1.3.1.5. 2-Butoxyethanol Solution of 1 mol/kg Tantalum penta-n-Butoxide

In a 20-g reagent bottle made of Pyrex equipped with a magnetic stirrer bar, 5.4640 g of tantalum penta-n-butoxide of Kojundo Chemical Lab. Co., Ltd. and 4.5360 g of 2-butoxyethanol Cica Special Grade of Kanto Chemical Co., Inc. were weighed. Then, the bottle was placed on a magnetic stirrer, and tantalum penta-n-butoxide was completely dissolved in 2-butoxyethanol while stirring at about 20° C. for 30 minutes, whereby a 2-butoxyethanol solution of 1 mol/kg tantalum penta-n-butoxide was obtained.

1.3.1.6. 2-Butoxyethanol Solution of 1 mol/kg Niobium Penta-n-butoxide

In a 20-g reagent bottle made of Pyrex equipped with a magnetic stirrer bar, 4.5850 g of niobium penta-n-butoxide of Kojundo Chemical Lab. Co., Ltd. and 5.4150 g of 2-butoxyethanol Cica Special Grade of Kanto Chemical Co., Inc. were weighed. Then, the bottle was placed on a magnetic stirrer, and niobium penta-n-butoxide was completely dissolved in 2-butoxyethanol while stirring at about 20° C. for 30 minutes, whereby a 2-butoxyethanol solution of 1 mol/kg niobium penta-n-butoxide was obtained.

1.3.1.7. 2-Butanone Solution of 0.5 mol/kg Polyvinylidene Fluoride (PVDF)

In a 20-g reagent bottle made of Pyrex equipped with a magnetic stirrer bar, 0.3200 g of polyvinylidene fluoride (PVDF) of Aldrich and 9.6800 g of 2-butanone of Kanto Chemical Co., Inc. were weighed. Then, the bottle was placed on a magnetic stirrer with a hot plate function, and polyvinylidene fluoride was completely dissolved in 2-butanone while stirring at 80° C. for 60 minutes, followed by gradual cooling to about 20° C., whereby a 2-butanone solution of 0.5 mol/kg polyvinylidene fluoride was obtained.

1.3.2. Preparation of Mixture

Subsequently, in Example 1 to Example 7, and Comparative Example 1 and Comparative Example 2, according to the compositions of the electrolytes shown in FIG. 5, mixtures in a liquid state were prepared by following the below-mentioned procedure. Here, Example 1 to Example 7 are also simply referred to as Examples hereinbelow, and Comparative Example 1 and Comparative Example 2 are also simply referred to as Comparative Examples hereinbelow. Note that the mixture of Example as used herein contains the compounds containing the elements constituting the lithium composite metal oxide of the compositional formula (1), that is, the precursors of the electrolyte of this embodiment.

1.3.2.1. Mixture Containing Precursors of $Li_{6.3}La_3Zr_{1.3}Sb_{0.5}Ta_{0.2}O_{11}F_1$ of Example 1 and Example 2

In Example 1 and Example 2, a mixture containing the precursors of $Li_{6.3}La_3Zr_{1.3}Sb_{0.5}Ta_{0.2}O_{11}F_1$ is prepared. First, in a glass beaker, 7.5600 g of the 2-butoxyethanol solution of 1 mol/kg lithium nitrate, 3.0000 g of the 2-butoxyethanol solution of 1 mol/kg lanthanum nitrate hexahydrate, 1.3000 g of the butanol solution of 1 mol/kg zirconium tetra-n-butoxide, 0.5000 g of the 2-butoxyethanol solution of 1 mol/kg antimony tri-n-butoxide, 0.2000 g of the 2-butoxyethanol solution of 1 mol/kg tantalum penta-n-butoxide, and 1.0000 g of the 2-butanone solution of 0.5 mol/kg polyvinylidene fluoride were weighed, and a magnetic stirrer bar was placed therein. Subsequently, stirring was performed at about 20° C. for 30 minutes using a magnetic stirrer, whereby a mixture of Example 1 and Example 2 was obtained.

1.3.2.2. Mixture Containing Precursors of $Li_{6.2}La_3Zr_{1.2}Sb_{0.4}Ta_{0.4}O_{11}F_1$ of Example 3

In Example 3, a mixture containing the precursors of $Li_{6.2}La_3Zr_{1.2}Sb_{0.4}Ta_{0.4}O_{11}F_1$ is prepared. First, in a glass beaker, 6.4400 g of the 2-butoxyethanol solution of 1 mol/kg lithium nitrate, 3.0000 g of the 2-butoxyethanol solution of 1 mol/kg lanthanum nitrate hexahydrate, 1.2000 g of the butanol solution of 1 mol/kg zirconium tetra-n-butoxide, 0.4000 g of the 2-butoxyethanol solution of 1 mol/kg antimony tri-n-butoxide, 0.4000 g of the 2-butoxyethanol solution of 1 mol/kg tantalum penta-n-butoxide, and 0.0260 g of lithium fluoride of Kojundo Chemical Laboratory Co., Ltd. were weighed, and a magnetic stirrer bar was placed therein. Subsequently, stirring was performed at about 20° C. for 30 minutes using a magnetic stirrer, whereby a mixture of Example 3 was obtained.

1.3.2.3. Mixture Containing Precursors of $Li_{5.95}La_3Zr_{0.95}Sb_{0.4}Ta_{0.4}Nb_{0.25}O_{11}F_1$ of Example 4

In Example 4, a mixture containing the precursors of $Li_{5.95}La_3Zr_{0.95}Sb_{0.4}Ta_{0.4}Nb_{0.25}O_{11}F_1$ is prepared. First, in a glass beaker, 6.1400 g of the 2-butoxyethanol solution of 1 mol/kg lithium nitrate, 3.0000 g of the 2-butoxyethanol solution of 1 mol/kg lanthanum nitrate hexahydrate, 0.9500 g of the butanol solution of 1 mol/kg zirconium tetra-n-butoxide, 0.4000 g of the 2-butoxyethanol solution of 1 mol/kg antimony tri-n-butoxide, 0.4000 g of the 2-butoxyethanol solution of 1 mol/kg tantalum penta-n-butoxide, 0.2500 g of the 2-butoxyethanol solution of 1 mol/kg niobium penta-n-butoxide, and 0.0260 g of lithium fluoride of Kojundo Chemical Laboratory Co., Ltd. were weighed, and a magnetic stirrer bar was placed therein. Subsequently, stirring was performed at about 20° C. for 30 minutes using a magnetic stirrer, whereby a mixture of Example 4 was obtained.

1.3.2.4. Mixture Containing Precursors of $Li_{5.95}La_3Zr_{0.95}Sb_{0.4}Ta_{0.4}Nb_{0.25}O_{11}F_1$ of Example 5

In Example 5, a mixture containing the precursors of $Li_{5.95}La_3Zr_{0.95}Sb_{0.4}Ta_{0.4}Nb_{0.25}O_{11}F_1$ is prepared. First, in a glass beaker, 7.1400 g of the 2-butoxyethanol solution of 1 mol/kg lithium nitrate, 3.0000 g of the 2-butoxyethanol solution of 1 mol/kg lanthanum nitrate hexahydrate, 0.9500 g of the butanol solution of 1 mol/kg zirconium tetra-n-butoxide, 0.4000 g of the 2-butoxyethanol solution of 1 mol/kg antimony tri-n-butoxide, 0.4000 g of the 2-butoxyethanol solution of 1 mol/kg tantalum penta-n-butoxide, 0.2500 g of the 2-butoxyethanol solution of 1 mol/kg niobium penta-n-butoxide, and 1.0000 g of the 2-butanone solution of 0.5 mol/kg polyvinylidene fluoride were weighed, and a magnetic stirrer bar was placed therein. Subsequently, stirring was performed at about 20° C. for 30 minutes using a magnetic stirrer, whereby a mixture of Example 5 was obtained.

1.3.2.5. Mixture Containing Precursors of $Li_{6.35}La_3Zr_{1.35}Sb_{0.4}Nb_{0.25}O_{11}F_1$ of Example 6

In Example 6, a mixture containing the precursors of $Li_{6.35}La_3Zr_{1.35}Sb_{0.4}Nb_{0.25}O_{11}F_1$ is prepared. First, in a glass beaker, 7.6200 g of the 2-butoxyethanol solution of 1 mol/kg lithium nitrate, 3.0000 g of the 2-butoxyethanol solution of 1 mol/kg lanthanum nitrate hexahydrate, 1.3500 g of the butanol solution of 1 mol/kg zirconium tetra-n-butoxide, 0.4000 g of the 2-butoxyethanol solution of 1 mol/kg antimony tri-n-butoxide, 0.2500 g of the 2-butoxyethanol solution of 1 mol/kg niobium penta-n-butoxide, and 1.0000 g of the 2-butanone solution of 0.5 mol/kg polyvinylidene fluoride were weighed, and a magnetic stirrer bar was placed therein. Subsequently, stirring was performed at about 20°

C. for 30 minutes using a magnetic stirrer, whereby a mixture of Example 6 was obtained.

1.3.2.6. Mixture Containing Precursors of $Li_{6.7}La_3Zr_{1.7}Ta_{0.05}Nb_{0.25}O_{11}F_1$ of Example 7

In Example 7, a mixture containing the precursors of $Li_{6.7}La_3Zr_{1.7}Ta_{0.05}Nb_{0.25}O_{11}F_1$ is prepared. First, in a glass beaker, 8.0400 g of the 2-butoxyethanol solution of 1 mol/kg lithium nitrate, 3.0000 g of the 2-butoxyethanol solution of 1 mol/kg lanthanum nitrate hexahydrate, 1.7000 g of the butanol solution of 1 mol/kg zirconium tetra-n-butoxide, 0.0500 g of the 2-butoxyethanol solution of 1 mol/kg tantalum penta-n-butoxide, 0.2500 g of the 2-butoxyethanol solution of 1 mol/kg niobium penta-n-butoxide, and 1.0000 g of the 2-butanone solution of 0.5 mol/kg polyvinylidene fluoride were weighed, and a magnetic stirrer bar was placed therein. Subsequently, stirring was performed at about 20° C. for 30 minutes using a magnetic stirrer, whereby a mixture of Example 7 was obtained.

1.3.2.7. Mixture Containing Precursors of $Li_{6.3}La_3Zr_{1.3}Sb_{0.5}Ta_{0.2}O_{12}$ of Comparative Example 1 and Comparative Example 2

In Comparative Example 1 and Comparative Example 2, a mixture containing the precursors of $Li_{6.3}La_3Zr_{1.3}Sb_{0.5}Ta_{0.2}O_{12}$ is prepared. First, in a glass beaker, 7.5600 g of the 2-butoxyethanol solution of 1 mol/kg lithium nitrate, 3.0000 g of the 2-butoxyethanol solution of 1 mol/kg lanthanum nitrate hexahydrate, 1.3000 g of the butanol solution of 1 mol/kg zirconium tetra-n-butoxide, 0.5000 g of the 2-butoxyethanol solution of 1 mol/kg antimony tri-n-butoxide, and 0.2000 g of the 2-butoxyethanol solution of 1 mol/kg tantalum penta-n-butoxide were weighed, and a magnetic stirrer bar was placed therein. Subsequently, stirring was performed at about 20° C. for 30 minutes using a magnetic stirrer, whereby a mixture of Comparative Example 1 and Comparative Example 2 was obtained. In the mixture of Comparative Example 1 and Comparative Example 2, a fluorine-containing compound is not contained.

In the mixtures of Examples except for Example 3 and Example 4 and in the mixtures of Comparative Examples, the 2-butoxyethanol solution of 1 mol/kg lithium nitrate was blended so that the molar ratio with respect to each predetermined theoretical composition becomes 1.20 times in consideration of the volatilization amount (extraction amount) of lithium due to heating in a post-process. The other solutions and lithium fluoride were blended in an equimolar ratio with respect to the theoretical composition. In Example 3 and Example 4, the mixtures were prepared so that the total amount of lithium contained in the 2-butoxyethanol solution of 1 mol/kg lithium nitrate and lithium fluoride becomes 1.20 times in molar ratio with respect to each predetermined theoretical composition.

1.3.3. Preparation of Solid Electrolyte Pellet

Solid electrolyte pellets for evaluation of electrolytes are prepared using the mixtures of Examples and Comparative Examples prepared above. The electrolytes shown in FIG. 5 are electrolytes contained in the electrolyte portions when producing lithium-ion batteries. Evaluation of the solid electrolyte pellet described below is evaluation of the electrolyte in the electrolyte portion.

First, the mixture was placed in a titanium dish having an inner diameter of 50 mm and a height of 20 mm. This dish was placed on a hot plate and heating was performed for 1 hour by setting the set temperature of the hot plate to 180° C. to remove the solvent. Subsequently, heating was performed for 30 minutes by setting the set temperature of the hot plate to 360° C. to decompose most of the contained organic components by combustion. Thereafter, heating was performed for 1 hour by setting the set temperature of the hot plate to 540° C. as a first heating treatment to burn and decompose the remaining organic components. Thereafter, the dish was gradually cooled to room temperature on the hot plate, whereby a 540° C.-calcined body was obtained.

Subsequently, the 540° C.-calcined body was transferred to an agate mortar and sufficiently ground and mixed. A 0.2000-g portion was weighed out from the mortar and then pressed at a pressure of 0.624 kN/mm² (624 MPa) for 5 minutes using a die with an exhaust port having an inner diameter of 10 mm as a molding die, whereby a 540° C.-calcined body pellet that is a circular disk-shaped molded material was prepared.

Further, the 540° C.-calcined body pellet was subjected to a second heating treatment under the firing condition of main firing shown in FIG. 5. Specifically, the 540° C.-calcined body pellet was placed in a crucible made of magnesium oxide, the crucible was covered with a lid made of magnesium oxide, and then, main firing was performed in an electric muffle furnace FP311 of Yamato Scientific Co., Ltd. The firing condition was set to 900° C. for 8 hours in Example 1 and Comparative Example 1, and 1000° C. for 8 hours in the other Examples and Comparative Example. Subsequently, the electric muffle furnace was gradually cooled to room temperature, and then, the pellet was taken out, whereby a solid electrolyte pellet for evaluation having a diameter of about 9.5 mm and a thickness of about 800 µm was formed.

The above operation was performed for the mixtures of Examples and Comparative Examples, whereby the respective solid electrolyte pellets were prepared.

1.3.4. Evaluation of Solid Electrolyte Pellet 1.3.4.1. Bulk Density

With respect to the solid electrolyte pellets of Example 1, Example 2, Comparative Example 1, and Comparative Example 2, bulk densities were measured. In the measurement of the bulk densities, the above-mentioned method for measuring the bulk density of the active material portion 2 was used. As a result, the bulk densities of Example 1, Example 2, Comparative Example 1, and Comparative Example 2 were about 57%.

1.3.4.2. XRD Analysis

With respect to the solid electrolyte pellets of Example 2 and Comparative Example 2, X-ray diffraction (XRD) analysis was performed. Specifically, introduction of fluorine (F) in an electrolyte crystal was examined using an X-ray diffractometer MRD of Philips Ltd. The results are shown in FIG. 6. FIG. 6 is a diagram showing X-ray diffraction charts of Example 2 and Comparative Example 2. In FIG. 6, the horizontal axis represents 2θ as the X-ray diffraction angle, and the vertical axis represents a diffraction intensity (Intensity/a.u.).

As shown in FIG. 6, in Example 2, diffraction peaks at the higher angle side shift toward the lower angle side with respect to those of Comparative Example 2. This suggests that the lattice constant in the electrolyte of Example 2 is increased. That is, it is indicated that the oxygen (O) site is partially substituted with fluorine (F) so that electron repulsion is increased. Based on this, it was shown that an electrolyte containing a lithium composite metal oxide represented by the compositional formula (1) can be produced by the above-mentioned method for producing an electrolyte.

1.3.4.3. Lithium Ion Conduction Property

With respect to the solid electrolyte pellets of Examples and Comparative Examples, as an index of the lithium ion conduction property, the lithium ion conductivity was evaluated by the following method.

A lithium electrode (ion activating electrode) having a diameter of 8 mm was prepared by lithium vapor deposition on both front and back faces of the solid electrolyte pellet. Subsequently, by using an impedance analyzer SI 1260 of Solartron, Inc., AC impedance measurement was performed. In the measurement, the AC amplitude was set to 10 mV and the measurement frequency was set to $10^7$ Hz to $10^{-1}$ Hz.

A grain bulk conductivity, a grain boundary conductivity, and a total ion conductivity as lithium ion conductivities were calculated from a grain bulk component of the spectrum and a grain boundary component of the spectrum in a Cole-Cole plot that is an impedance spectrum obtained by the AC impedance measurement. In any of the solid electrolyte pellets of Examples and Comparative Examples, the grain bulk component and the grain boundary component were integrated and could not be separated. Therefore, in FIG. 7, only the total ion conductivity was calculated and shown. FIG. 7 is a table showing the compositions and the lithium ion conductivities of the electrolytes according to Examples and Comparative Examples.

As shown in FIG. 7, in the solid electrolyte pellets of Example 1 to Example 7, the total ion conductivity was $2.8 \times 10^{-4}$ S/cm or more. The total ion conductivity that is an index of the lithium ion conduction property of the electrolyte 3b is preferably $1.5 \times 10^{-4}$ S/cm, and the above results exceeded this value. Therefore, it was shown that in the electrolyte containing the lithium composite metal oxide represented by the compositional formula (1), the grain boundary resistance of crystal grains is decreased and the lithium ion conduction property is improved.

On the other hand, in the solid electrolyte pellets of Comparative Example 1 and Comparative Example 2, the total ion conductivity was less than $1.5 \times 10^{-4}$ S/cm. From these results, it was found that the electrolytes of Comparative Example 1 and Comparative Example 2 are inferior to those of Examples.

2. Second Embodiment 2.1. Methods for Producing Electrolyte and Battery

Figure 8:
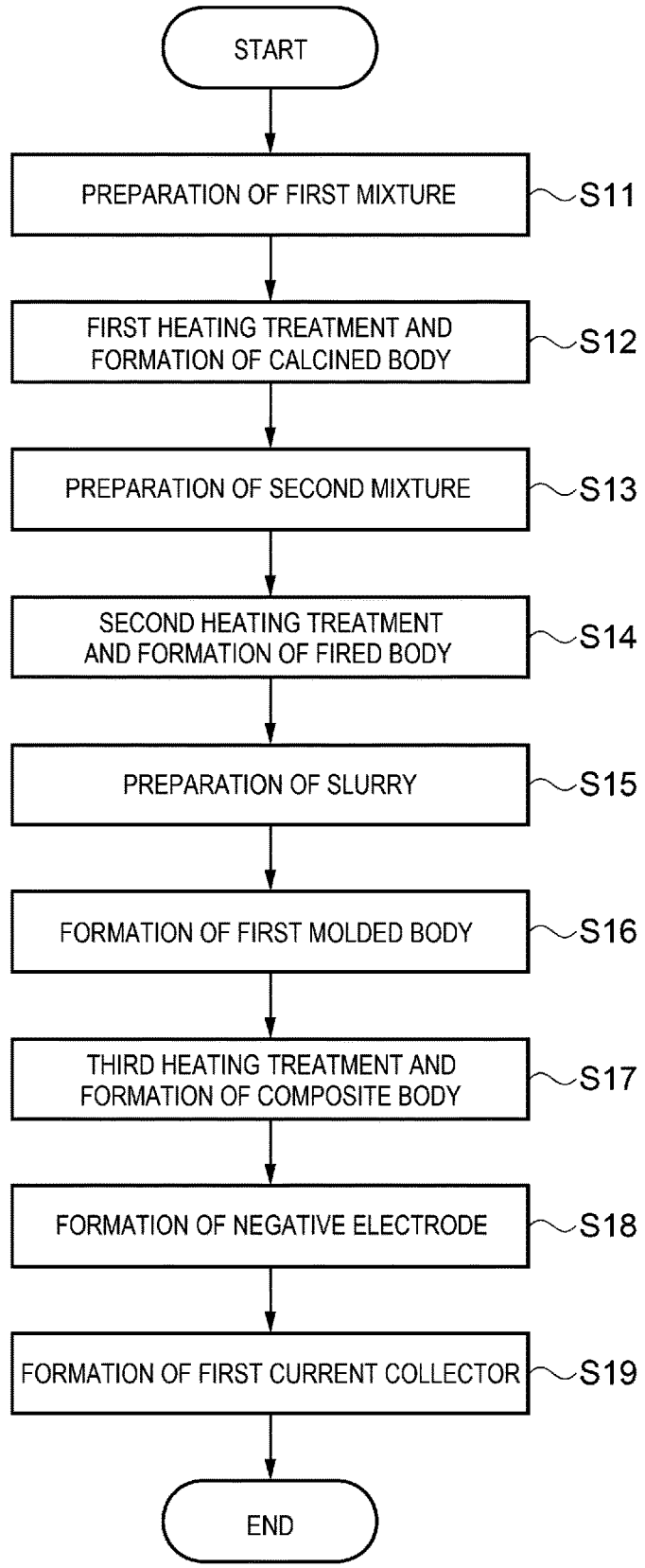
FIG. 8 is a process flow diagram showing a method for producing a lithium-ion battery as a battery according to a second embodiment.
Figure 9A:
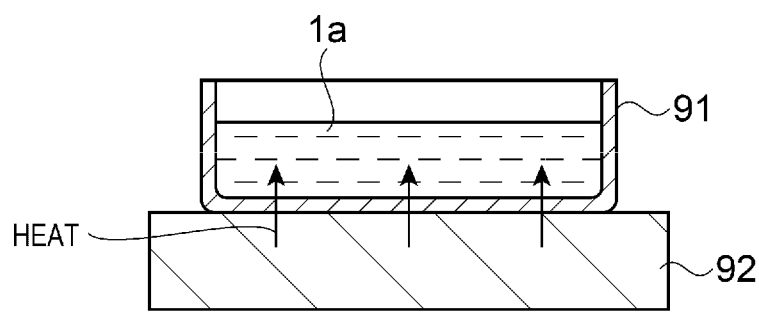
FIG. 9A is a schematic view showing the method for producing a lithium-ion battery.
Figure 9B:
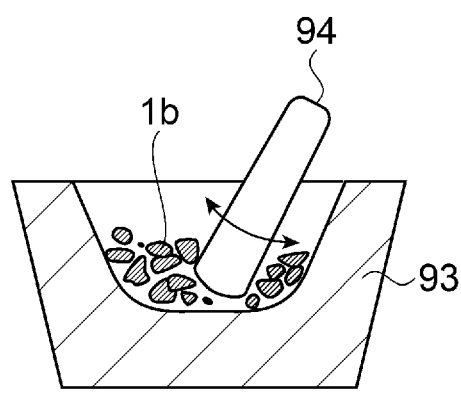
FIG. 9B is a schematic view showing the method for producing a lithium-ion battery.

Methods for producing an electrolyte and a battery according to this embodiment will be described with reference to FIGS. 8, 9A, and 9B. In this embodiment, an explanation will be given by showing a lithium-ion battery as an example of the battery. FIG. 8 is a process flow diagram showing a method for producing a lithium-ion battery as the battery according to a second embodiment. FIGS. 9A and 9B are each a schematic view showing the method for producing a lithium-ion battery. The process flow shown in FIG. 8 is an example and the method is not limited thereto. Further, the same constituent portions as in the first embodiment are denoted by the same reference numerals and a repeated description thereof will be omitted.

As shown in FIG. 8, the method for producing a lithium-ion battery of this embodiment includes the following steps. In Step S11, a first mixture is prepared by mixing a plurality of types of raw materials containing elements constituting a lithium composite metal oxide represented by the following compositional formula (2). In Step S12, a calcined body is formed by subjecting the first mixture to a first heating treatment. In Step S13, a second mixture is prepared by mixing the calcined body with a fluorine-containing inorganic compound. In Step S14, a fired body is formed by subjecting the second mixture to a second heating treatment. In Step S15, a slurry is prepared by grinding the fired body and thereafter mixing the ground fired body with a solvent. In Step S16, an active material portion as a first molded body is formed using an active material. In Step S17, a positive electrode as a composite body including the active material portion and an electrolyte portion containing a crystalline electrolyte is formed by performing a third heating treatment in a state where the slurry and the active material portion are brought into contact with each other. In Step S18, a negative electrode is formed, via an electrolyte layer, at one face of the positive electrode. In Step S19, a first current collector is formed at the other face of the positive electrode.

$$Li_{7-x}La_3(Zr_{2-x}A_x)O_{12} \qquad (2)$$

In the formula, $0.1 \leq x \leq 1.0$, and A represents two or more types of Ta, Nb, and Sb.

Here, in the method for producing a lithium-ion battery of this embodiment, the following method for producing an electrolyte is included. That is, the method for producing an electrolyte of this embodiment includes a step of preparing a first mixture by mixing a plurality of types of raw materials containing elements constituting a lithium composite metal oxide represented by the compositional formula (2), a step of forming a calcined body by subjecting the first mixture to a first heating treatment, a step of preparing a second mixture by mixing the calcined body with a fluorine-containing inorganic compound, and a step of forming a crystalline electrolyte by subjecting the second mixture to a second heating treatment.

These steps included in the method for producing an electrolyte of this embodiment are included in Step S11, Step S12, Step S13, and Step S14 in the method for producing a lithium-ion battery described above. In this embodiment, an explanation will be given by showing a method for producing an electrolyte using a liquid phase method as an example, but the method is not limited thereto. For example, a second mixture in a powder form may be prepared by mixing a ground calcined body with a fluorine-containing compound, and filled in the active material portion.

The method for producing an electrolyte of this embodiment is different from the method for producing an electrolyte of the first embodiment in the following aspects: a calcined body is formed from a first mixture that does not contain a fluorine-containing compound; an electrolyte is formed by preparing a second mixture from the calcined body and a fluorine-containing compound; and the like. In addition thereto, the method for producing a lithium-ion battery of this embodiment is different from the method for producing the lithium-ion battery 100 of the first embodiment in that a slurry is prepared from a fired body and is brought into contact with the active material portion and impregnated thereinto, and the like.

2.1.1. Preparation of First Mixture

In Step S11, a plurality of types of raw materials containing elements constituting a lithium composite metal oxide represented by the compositional formula (2) are each dissolved in a solvent to prepare solutions, and thereafter these solutions are mixed, whereby a first mixture in a liquid state is prepared. That is, the first mixture contains a solvent for dissolving the raw materials. As the raw materials, compounds containing the elements constituting the lithium composite metal oxide represented by the compositional formula (2) are used. Here, the lithium composite metal oxide represented by the compositional formula (2) is also simply referred to as the lithium composite metal oxide of the compositional formula (2).

As the compounds containing the elements constituting the lithium composite metal oxide of the compositional formula (2), metal compounds of a lithium compound, a lanthanum compound, a zirconium compound, a tantalum compound, a niobium compound, and an antimony compound are used. Hereinafter, the compounds containing the elements constituting the lithium composite metal oxide of the compositional formula (2) are also referred to as the precursors of the lithium composite metal oxide of the compositional formula (2). As the metal compounds, the same compounds as those in the first embodiment can be adopted. Here, in the first mixture, two or more types of a tantalum compound, a niobium compound, and an antimony compound are used. Further, as the solvent contained in the first mixture in a liquid state, the same solvent as in the first embodiment can be adopted.

A plurality of solutions containing the precursors of the lithium composite metal oxide of the compositional formula (2) are prepared by dissolving the precursors of the lithium composite metal oxide of the compositional formula (2) in any of the above-mentioned solvents. Subsequently, a first mixture is prepared by mixing the plurality of solutions. At this time, lithium, lanthanum, zirconium, and two or more types of tantalum, niobium, and antimony are incorporated in the mixture in a predetermined ratio according to the composition of the lithium composite metal oxide of the compositional formula (2). At this time, the first mixture may be prepared by mixing all the precursors of the lithium composite metal oxide of the compositional formula (2), and then dissolving the mixed precursors in a solvent without preparing the plurality of solutions each containing each of the precursors of the lithium composite metal oxide of the compositional formula (2).

Lithium in the composition is sometimes volatilized by heating in a post-process. Therefore, the lithium compound may be blended excessively in advance so that the content of the lithium compound in the first mixture is about 1.05 times to 1.30 times in molar ratio with respect to the desired composition according to the heating condition.

The preparation of the first mixture is performed, for example, in the same manner as shown in FIG. 4A in the first embodiment. Then, the process proceeds to Step S12.

2.1.2. First Heating Treatment and Formation of Calcined Body

In Step S12, a calcined body is formed by subjecting the first mixture to a first heating treatment. Specifically, the first mixture is subjected to a first heating treatment, whereby removal of the solvent by volatilization and removal of the organic components by combustion or thermal decomposition are performed. The heating temperature in the first heating treatment is set to 500° C. or higher and 650° C. or lower. Subsequently, as shown in FIG. 9A, a first mixture 1a is placed in a titanium dish 91 having an inner diameter of 50 mm and a height of 20 mm, and the dish is placed on a hot plate 92 and heating is performed for 1 hour by setting the set temperature of the hot plate 92 to 180° C. to remove the solvent. Subsequently, heating is performed for 30 minutes by setting the set temperature of the hot plate 92 to 360° C. to decompose most of the organic components contained in the first mixture 1a by combustion. Thereafter, heating is performed for 1 hour by setting the set temperature of the hot plate 92 to, for example, 540° C. as the first heating treatment. By doing this, the organic components remaining in the first mixture 1a are burned and decomposed, whereby a calcined body is obtained.

Subsequently, the calcined body is ground and mixed. For details, as shown in FIG. 9B, a calcined body 1b is sufficiently ground and mixed to form a powder using an agate mortar 93 and an agate pestle 94. At this time, the average particle diameter of the ground and mixed calcined body 1b is preferably set to 0.1 μm or more and 5 μm or less, and is more preferably 0.3 μm or more and 1 μm or less. By adjusting the average particle diameter, in the below-mentioned second heating treatment, a reaction between the calcined body 1b and a fluorine-containing inorganic compound is accelerated. The average particle diameter can be measured in the same manner as the average particle diameter of the active material 2b described above. Then, the process proceeds to Step S13.

2.1.3. Preparation of Second Mixture

In Step S13, a second mixture in a powder form is prepared by mixing the calcined body with a fluorine-containing inorganic compound. As the fluorine-containing inorganic compound, the same fluorine-containing inorganic compound as in the first embodiment can be adopted. Then, the process proceeds to Step S14.

2.1.4. Second Heating Treatment and Formation of Fired Body

In Step S14, a fired body is formed by performing a second heating treatment after molding the second mixture in a powder form. For details, a circular disk-shaped molded material of the second mixture is prepared in the same manner as shown in FIG. 4B in the first embodiment. The shape of the circular disk-shaped molded material is not particularly limited, but is set to, for example, 10 mm in diameter, 8 mm in effective diameter, and 150 μm in thickness.

Thereafter, the circular disk-shaped molded material of the second mixture is placed on a substrate, and subjected to a second heating treatment. In the second heating treatment, the heating temperature is 800° C. or higher and 1000° C. or lower, and the time of the second heating treatment is not particularly limited, but is, for example, 2 hours or more and 36 hours or less. By the second heating treatment, the lithium composite metal oxide of the compositional formula (2) and fluorine (F) of the fluorine-containing inorganic compound react with each other, so that oxygen (O) constituting the lithium composite metal oxide of the compositional formula (2) is substituted with fluorine (F). According to this, the electrolyte containing the lithium composite metal oxide of the compositional formula (1) is formed as the fired body. A forming material of the substrate is not particularly limited, however, it is preferred to use a material that hardly reacts with the second mixture, and for example, magnesium oxide or the like is exemplified. Then, the process proceeds to Step S15.

2.1.5. Preparation of Slurry

In Step S15, first, in the same manner as shown in FIG. 9B in Step S12, the fired body is sufficiently ground and mixed to form a powder using an agate mortar 93 and an agate pestle 94. The average particle diameter of the ground and mixed fired body is preferably set to 0.1 μm or more and 5 μm or less, and is more preferably 0.3 μm or more and 1 μm or less. By adjusting the average particle diameter of the fired body in a powder form, the bulk density can be adjusted in the electrolyte portion. The average particle diameter of the fired body in a powder form can be measured by the above-mentioned method. In order to adjust the average particle diameter of the fired body in a powder form, a classification operation may be performed using a wet-type centrifuge or the like.

Subsequently, a slurry is prepared from the fired body in a powder form and a solvent. As the solvent, a solvent used in the mixture in a liquid state in the first embodiment or the like can be adopted. Specifically, in the same manner as shown in FIG. 4A in Step S1, the fired body in a powder form and a solvent are placed in a beaker 81. A magnetic stirrer bar 82 is placed therein, and mixing is performed while stirring using a magnetic stirrer 83. By doing this, a slurry is obtained. Here, to the slurry, a dispersant, an antifoaming agent, or a binder such as polypropylene carbonate may be added as an auxiliary agent. Then, the process proceeds to Step S16.

2.1.6. Formation of First Molded Body

In Step S16, a first molded body, that is, a circular disk-shaped molded material of an active material portion is formed in the same manner as in the first embodiment. Then, the process proceeds to Step S17.

2.1.7. Third Heating Treatment and Formation of Composite Body

In Step S17, the slurry prepared in Step S15 is brought into contact with the active material portion and impregnated thereinto, followed by performing a third heating treatment, whereby an electrolyte portion is produced from the slurry. By doing this, the electrolyte portion including an electrolyte is formed at a surface including the inside of a plurality of pores of the active material portion, whereby a positive electrode as a composite body is obtained, Here, in the electrolyte, the lithium composite metal oxide of the compositional formula (1) is contained as described above.

For details, in the same manner as shown in FIG. 4C in the first embodiment, the slurry and the active material portion are brought into contact with each other and the slurry is impregnated into the active material portion. Specifically, the slurry is applied to the surface of the active material portion including the inside of the pores of the active material portion using a micropipette 88 or the like. As a method for applying the slurry, other than dropping using the micropipette 88, for example, a method such as immersion, spraying, penetration by capillary phenomenon, or spin coating can be used, and these methods may be performed in combination. The slurry has fluidity, and therefore also easily reaches the inside of the pores of the active material portion by capillary phenomenon. The slurry is applied so as to wet and spread on the entire surface including the inside of the pores of the active material portion.

Here, when the electrolyte layer of the lithium-ion battery is formed from the same forming material as that of the electrolyte portion, the slurry is excessively applied to one face of the active material portion. By performing the below-mentioned third heating treatment in this state, the active material portion is completely sunk in the electrolyte portion, and the electrolyte layer is formed. In this embodiment, the positive electrode and the electrolyte layer are formed at a time by the above-mentioned method.

Subsequently, the active material portion and the slurry are subjected to a third heating treatment. In the third heating treatment, the heating temperature is set to 800° C. or higher and 1000° C. or lower. The third heating treatment is performed in the same manner as shown in FIG. 4D in the first embodiment. The third heating treatment may be performed in a dry atmosphere or an oxidizing atmosphere. A time of the third heating treatment is not particularly limited, but is, for example, 2 hours or more and 36 hours or less. By the third heating treatment, the solvent or an organic substance such as an impurity contained in the slurry is decomposed and reduced, whereby the electrolyte portion containing the electrolyte can be formed. The resulting material is gradually cooled to room temperature after the third heating treatment, whereby the composite body is formed.

Here, the bulk density of the composite body is set to about 90% or more and 100% or less. When the bulk density of the composite body is less than 90%, Step S17 is repeatedly performed until the bulk density reaches 90% or more. The bulk density of the composite body can be determined in the same manner as the bulk density of the active material portion 2 described above.

In this manner, the positive electrode as the composite body in which the active material portion and the electrolyte portion are combined is obtained. Further, the electrolyte layer is formed at one face of the positive electrode as described above. Then, the process proceeds to Step S18.

Step S18 and the subsequent Step S19 are performed in the same manner as Step S4 and the subsequent Step S5 in the first embodiment. By undergoing the above-mentioned steps, the lithium-ion battery of this embodiment is produced.

As described above, by the methods for producing an electrolyte and a lithium-ion battery according to the second embodiment, in addition to the effects of the first embodiment, the following effect can be obtained.

The lithium composite metal oxide of the compositional formula (1) can be produced from the second mixture containing a fluorine-containing inorganic compound. That is, an electrolyte and a lithium-ion battery in which the grain boundary resistance is decreased as compared with the related art and the lithium ion conduction property is improved can be produced.

2.2. Examples and Comparative Examples

Next, the effects of the second embodiment will be more specifically described by showing Examples and Comparative Examples with respect to the method for producing an electrolyte of the second embodiment. FIG. 10 is a table showing electrolyte compositions of calcined bodies according to Examples and Comparative Examples.

2.2.1. Preparation of Solutions Containing Precursors of Electrolyte

First, by using a lithium compound, a lanthanum compound, a zirconium compound, an antimony compound, a tantalum compound, a niobium compound, and a solvent, the following solutions each containing each of the compounds as a precursor of the electrolyte were prepared in the same manner as in the first embodiment. Specifically, as a solution containing a lithium compound, a 2-butoxyethanol solution of 1 mol/kg lithium nitrate was prepared. As a solution containing a lanthanum compound, a 2-butoxyethanol solution of 1 mol/kg lanthanum nitrate hexahydrate was prepared. As a solution containing a zirconium compound, a butanol solution of 1 mol/kg zirconium tetra-n-butoxide was prepared. As a solution containing an antimony compound, a 2-butoxyethanol solution of 1 mol/kg antimony tri-n-butoxide was prepared. As a solution containing a tantalum compound, a 2-butoxyethanol solution of 1 mol/kg tantalum penta-n-butoxide was prepared. As a solution containing a niobium compound, a 2-butoxyethanol solution of 1 mol/kg niobium penta-n-butoxide was prepared.

2.2.2. Preparation of First Mixture

Subsequently, in Example 8 to Example 12, and Comparative Example 3 to Comparative Example 5, according to the electrolyte compositions of calcined bodies shown in FIG. 10, first mixtures in a liquid state were prepared by following the below-mentioned procedure. Here, Example 8 to Example 12 are also simply referred to as Examples hereinbelow, and Comparative Example 3 to Comparative Example 5 are also simply referred to as Comparative Examples hereinbelow. Note that the first mixture of Example as used herein contains the compounds containing the elements constituting the lithium composite metal oxide of the compositional formula (2), that is, the precursors of the electrolyte of the below-mentioned calcined body.

2.2.2.1. First Mixture Containing Precursors of $Li_{6.2}La_3Zr_{1.2}Sb_{0.4}Ta_{0.4}O_{12}$ of Example 8

In Example 8, a first mixture containing the precursors of $Li_{6.2}La_3Zr_{1.2}Sb_{0.4}Ta_{0.4}O_{12}$ is prepared. First, in a glass beaker, 6.4400 g of the 2-butoxyethanol solution of 1 mol/kg lithium nitrate, 3.0000 g of the 2-butoxyethanol solution of 1 mol/kg lanthanum nitrate hexahydrate, 1.2000 g of the butanol solution of 1 mol/kg zirconium tetra-n-butoxide, 0.4000 g of the 2-butoxyethanol solution of 1 mol/kg antimony tri-n-butoxide, and 0.4000 g of the 2-butoxyethanol solution of 1 mol/kg tantalum penta-n-butoxide were weighed, and a magnetic stirrer bar was placed therein. Subsequently, stirring was performed at about 20° C. for 30 minutes using a magnetic stirrer, whereby a first mixture of Example 8 was obtained.

2.2.2.2. First Mixture Containing Precursors of $Li_{5.95}La_3Zr_{0.95}Sb_{0.4}Ta_{0.4}Nb_{0.25}O_{12}$ of Example 9

In Example 9, a first mixture containing the precursors of $Li_{5.95}La_3Zr_{0.95}Sb_{0.4}Ta_{0.4}Nb_{0.25}O_{12}$ is prepared. First, in a glass beaker, 6.1400 g of the 2-butoxyethanol solution of 1 mol/kg lithium nitrate, 3.0000 g of the 2-butoxyethanol solution of 1 mol/kg lanthanum nitrate hexahydrate, 0.9500 g of the butanol solution of 1 mol/kg zirconium tetra-n-butoxide, 0.4000 g of the 2-butoxyethanol solution of 1 mol/kg antimony tri-n-butoxide, 0.4000 g of the 2-butoxyethanol solution of 1 mol/kg tantalum penta-n-butoxide, and 0.2500 g of the 2-butoxyethanol solution of 1 mol/kg niobium penta-n-butoxide were weighed, and a magnetic stirrer bar was placed therein. Subsequently, stirring was performed at about 20° C. for 30 minutes using a magnetic stirrer, whereby a first mixture of Example 9 was obtained.

2.2.2.3. First Mixture Containing Precursors of $Li_{6.35}La_3Zr_{1.35}Sb_{0.4}Nb_{0.25}O_{12}$ of Example 10

In Example 10, a first mixture containing the precursors of $Li_{6.35}La_3Zr_{1.35}Sb_{0.4}Nb_{0.25}O_{12}$ is prepared. First, in a glass beaker, 6.6200 g of the 2-butoxyethanol solution of 1 mol/kg lithium nitrate, 3.0000 g of the 2-butoxyethanol solution of 1 mol/kg lanthanum nitrate hexahydrate, 1.3500 g of the butanol solution of 1 mol/kg zirconium tetra-n-butoxide, 0.4000 g of the 2-butoxyethanol solution of 1 mol/kg antimony tri-n-butoxide, and 0.2500 g of the 2-butoxyethanol solution of 1 mol/kg niobium penta-n-butoxide were weighed, and a magnetic stirrer bar was placed therein. Subsequently, stirring was performed at about 20° C. for 30 minutes using a magnetic stirrer, whereby a first mixture of Example 10 was obtained.

2.2.2.4. First Mixture Containing Precursors of $Li_{6.7}La_3Zr_{1.7}Ta_{0.05}Nb_{0.25}O_{12}$ of Example 11

In Example 11, a first mixture containing the precursors of $Li_{6.7}La_3Zr_{1.7}Ta_{0.05}Nb_{0.25}O_{12}$ is prepared. First, in a glass beaker, 7.0400 g of the 2-butoxyethanol solution of 1 mol/kg lithium nitrate, 3.0000 g of the 2-butoxyethanol solution of 1 mol/kg lanthanum nitrate hexahydrate, 1.700 g of the butanol solution of 1 mol/kg zirconium tetra-n-butoxide, 0.0500 g of the 2-butoxyethanol solution of 1 mol/kg tantalum penta-n-butoxide, and 0.2500 g of the 2-butoxyethanol solution of 1 mol/kg niobium penta-n-butoxide were weighed, and a magnetic stirrer bar was placed therein. Subsequently, stirring was performed at about 20° C. for 30 minutes using a magnetic stirrer, whereby a first mixture of Example 11 was obtained.

2.2.2.5. First Mixture Containing Precursors of $Li_{6.35}La_3Zr_{1.35}Sb_{0.4}Nb_{0.25}O_{12}$ of Example 12

In Example 12, a first mixture containing the precursors of $Li_{6.35}La_3Zr_{1.35}Sb_{0.4}Nb_{0.25}O_{12}$ is prepared. First, in a glass beaker, 7.1200 g of the 2-butoxyethanol solution of 1 mol/kg lithium nitrate, 3.0000 g of the 2-butoxyethanol solution of 1 mol/kg lanthanum nitrate hexahydrate, 1.3500 g of the butanol solution of 1 mol/kg zirconium tetra-n-butoxide, 0.4000 g of the 2-butoxyethanol solution of 1 mol/kg antimony tri-n-butoxide, and 0.2500 g of the 2-butoxyethanol solution of 1 mol/kg niobium penta-n-butoxide were weighed, and a magnetic stirrer bar was placed therein. Subsequently, stirring was performed at about 20° C. for 30 minutes using a magnetic stirrer, whereby a first mixture of Example 12 was obtained.

2.2.2.6. First Mixtures Containing Precursors of $Li_{6.2}La_3Zr_{1.2}Sb_{0.4}Ta_{0.4}O_{12}$ of Comparative Example 3, Comparative Example 4, and Comparative Example 5

In Comparative Example 3, Comparative Example 4, and Comparative Example 5, each of the first mixtures containing the precursors of $Li_{6.2}La_3Zr_{1.2}Sb_{0.4}Ta_{0.4}O_{12}$ was prepared by setting the amount of the 2-butoxyethanol solution of 1 mol/kg lithium nitrate to 7.4400 g in Comparative Example 3, 2.4400 g in Comparative Example 4, and 5.9400 g in Comparative Example 5. The other solutions containing the precursors of the electrolyte were prepared in the same manner as in Example 8.

Here, in Examples, Comparative Example 4, and Comparative Example 5, lithium fluoride is added in the below-mentioned preparation of the second mixture. Therefore, at these levels, the first mixtures were prepared so that the total amount of lithium contained in the 2-butoxyethanol solution of 1 mol/kg lithium nitrate and lithium fluoride becomes 1.20 times in molar ratio with respect to each of the predetermined theoretical compositions.

2.2.3. First Heating Treatment and Formation of Calcined Body

Calcined bodies are prepared using the first mixtures of Examples and Comparative Examples. Specifically, each of the first mixtures was placed in a titanium dish having an inner diameter of 50 mm and a height of 20 mm, and the dish was placed on a hot plate and heating was performed for 1 hour by setting the set temperature of the hot plate to 180° C. as described above. Subsequently, heating was performed for 30 minutes by setting the set temperature of the hot plate to 360° C. to decompose most of the contained organic components by combustion. Thereafter, heating was performed for 1 hour by setting the set temperature of the hot plate to 540° C. as the first heating treatment. By doing this, the remaining organic components were burned and decomposed, whereby the respective calcined bodies of Examples and Comparative Examples were obtained.

2.2.4. Preparation of Second Mixture

Second mixtures are prepared using the calcined bodies of Examples and Comparative Examples. First, as described above, each of the calcined bodies was ground and mixed using an agate mortar and an agate pestle. Subsequently, in Examples, Comparative Example 4, and Comparative Example 5, lithium fluoride (LiF) as a fluorine-containing inorganic compound was mixed in the ground calcined body according to the below-mentioned procedure.

In Example 8 to Example 11, 0.0060 g of lithium fluoride was added to 0.2000 g of each of the ground calcined bodies, followed by stirring and mixing using an agate mortar and an agate pestle. Here, 0.0060 g of lithium fluoride is an amount capable of substituting 1 mol of oxygen (O) in the electrolyte compositions of the calcined bodies in Example 8 to Example 11 shown in FIG. 10. By doing this, the second mixtures of Example 8 to Example 11 were obtained.

Here, from the second mixture of Example 8, by the below-mentioned second heating treatment, a lithium composite metal oxide represented by $Li_{6.2}La_3Zr_{1.2}Sb_{0.4}Ta_{0.4}O_{11}F_1$ is obtained as the electrolyte of the compositional formula (1). From the second mixture of Example 9, by the below-mentioned second heating treatment, a lithium composite metal oxide represented by $Li_{5.95}La_3Zr_{0.95}Sb_{0.4}Ta_{0.4}Nb_{0.25}O_{11}F_1$ is obtained as the electrolyte of the compositional formula (1). From the second mixture of Example 10, by the below-mentioned second heating treatment, a lithium composite metal oxide represented by $Li_{6.35}La_3Zr_{1.35}Sb_{0.4}Nb_{0.25}O_{11}F_1$ is obtained as the electrolyte of the compositional formula (1). From the second mixture of Example 11, by the below-mentioned second heating treatment, a lithium composite metal oxide represented by $Li_{6.7}La_3Zr_{1.7}Ta_{0.05}Nb_{0.25}O_{11}F_1$ is obtained as the electrolyte of the compositional formula (1).

In Example 12, 0.0030 g of lithium fluoride was added to 0.2000 g of the ground calcined body, followed by stirring and mixing using an agate mortar and an agate pestle. Here, 0.0030 g of lithium fluoride is an amount capable of substituting 0.5 mol of oxygen (O) in the electrolyte composition of the calcined body in Example 12 shown in FIG. 10. By doing this, the second mixture of Example 12 was obtained.

Here, from the second mixture of Example 12, by the below-mentioned second heating treatment, a lithium composite metal oxide represented by $Li_{6.35}La_3Zr_{1.35}Sb_{0.4}Nb_{0.25}O_{11.5}F_{0.5}$ is obtained as the electrolyte of the compositional formula (1).

In Comparative Example 3, the ground calcined body was used as the second mixture without any change. That is, Comparative Example 3 is at a level where a fluorine-containing inorganic compound is not added to the second mixture. Therefore, from the second mixture of Comparative Example 3, by the below-mentioned second heating treatment, a lithium composite metal oxide represented by $Li_{6.2}La_3Zr_{1.2}Sb_{0.4}Ta_{0.4}O_{12}$ is obtained.

In Comparative Example 4, 0.0300 g of lithium fluoride was added to 0.2000 g of the ground calcined body, followed by stirring and mixing using an agate mortar and an agate pestle. Here, 0.0300 g of lithium fluoride is an amount capable of substituting 5 mol of oxygen (O) in the electrolyte composition of the calcined body in Comparative Example 4 shown in FIG. 10. By doing this, the second mixture of Comparative Example 4 was obtained.

Here, from the second mixture of Comparative Example 4, by the below-mentioned second heating treatment, a lithium composite metal oxide represented by $Li_{6.2}La_3Zr_{1.2}Sb_{0.4}Ta_{0.4}O_7F_5$ is obtained as an electrolyte.

In Comparative Example 5, 0.0090 g of lithium fluoride was added to 0.2000 g of the ground calcined body, followed by stirring and mixing using an agate mortar and an agate pestle. Here, 0.0090 g of lithium fluoride is an amount capable of substituting 1.5 mol of oxygen (O) in the electrolyte composition of the calcined body in Comparative Example 5 shown in FIG. 10. By doing this, the second mixture of Comparative Example 5 was obtained.

Here, from the second mixture of Comparative Example 5, by the below-mentioned second heating treatment, a lithium composite metal oxide represented by $Li_{6.2}La_3Zr_{1.2}Sb_{0.4}Ta_{0.4}O_{10.5}F_{1.5}$ is obtained as an electrolyte.

The compositions of the lithium composite metal oxides as the electrolytes obtained by the second heating treatment of Examples and Comparative Examples described above are shown in the below-mentioned FIG. 11 as the composition of the electrolyte.

2.2.5. Preparation of Solid Electrolyte Pellet

Solid electrolyte pellets for evaluation of electrolytes are prepared using the second mixtures of Examples and Comparative Examples prepared above.

First, the second mixture is weighed to 0.2000 g and pressed at a pressure of 0.624 $kN/mm^2$ (624 MPa) for 5 minutes using a die with an exhaust port having an inner diameter of 10 mm, whereby a pellet as a circular disk-shaped molded material of the second mixture is prepared.

Subsequently, the pellet of the second mixture is subjected to a second heating treatment. Specifically, the pellet of the second mixture is placed in a crucible made of magnesium oxide, and the crucible is covered with a lid made of magnesium oxide, and the second heating treatment, that is, main firing is performed in an electric muffle furnace FP311 of Yamato Scientific Co., Ltd. The heating condition of the main firing as the second heating treatment was set to 1000° C. for 8 hours. Thereafter, the electric muffle furnace was gradually cooled to room temperature and the pellet was taken out, whereby a solid electrolyte pellet for evaluation having a diameter of about 9.5 mm and a thickness of about 800 μm was formed.

The above operation was performed for the mixtures of Examples and Comparative Examples, whereby the respective solid electrolyte pellets were prepared.

2.2.6. Evaluation of Solid Electrolyte Pellet

Figure 12:
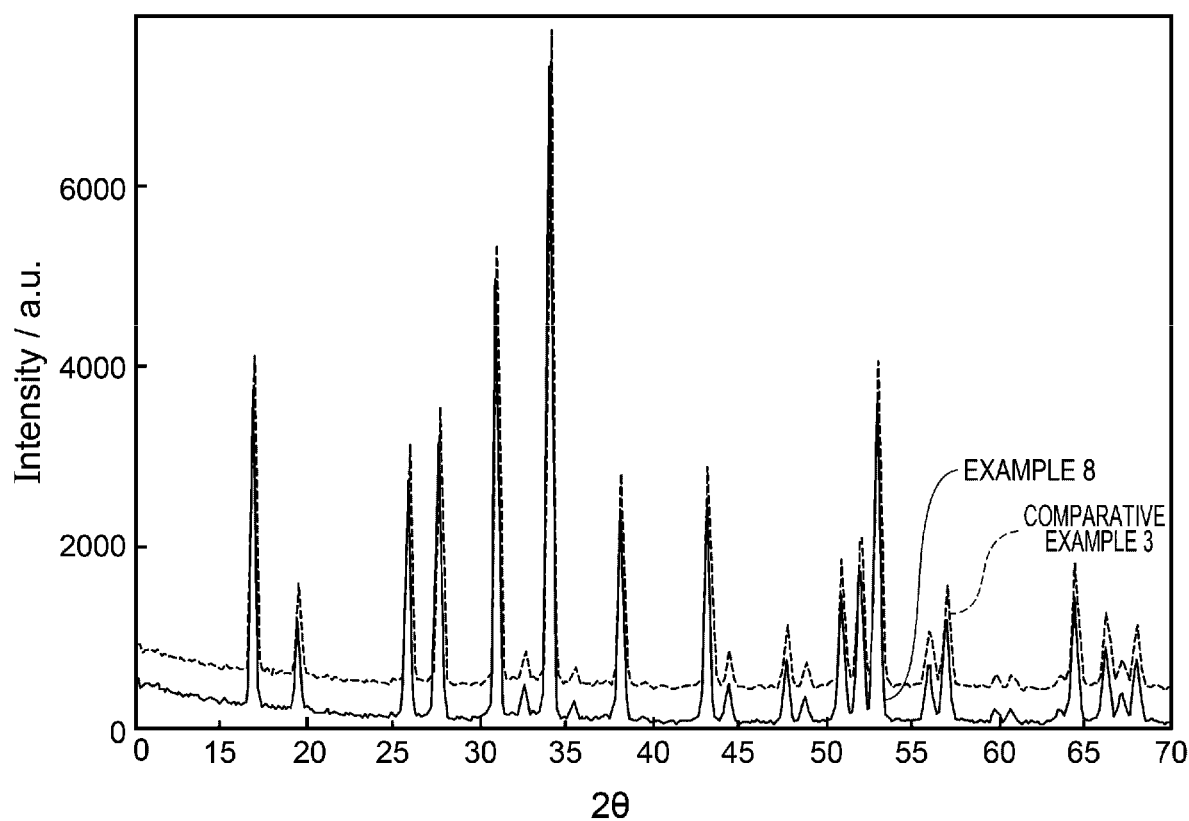
FIG. 12 is a diagram showing X-ray diffraction charts of Example 8 and Comparative Example 3.
Figure 13:
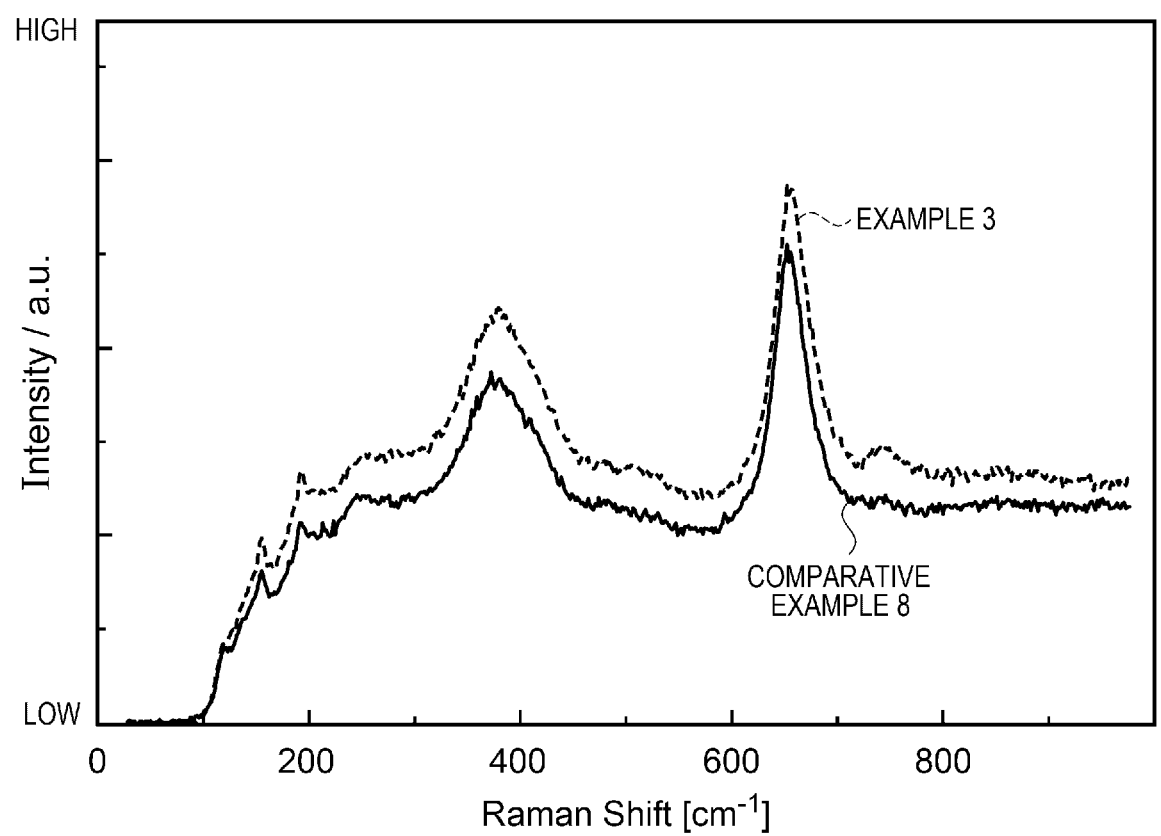
FIG. 13 is a diagram showing Raman scattering spectra of Example 8 and Comparative Example 3.
Figure 14:
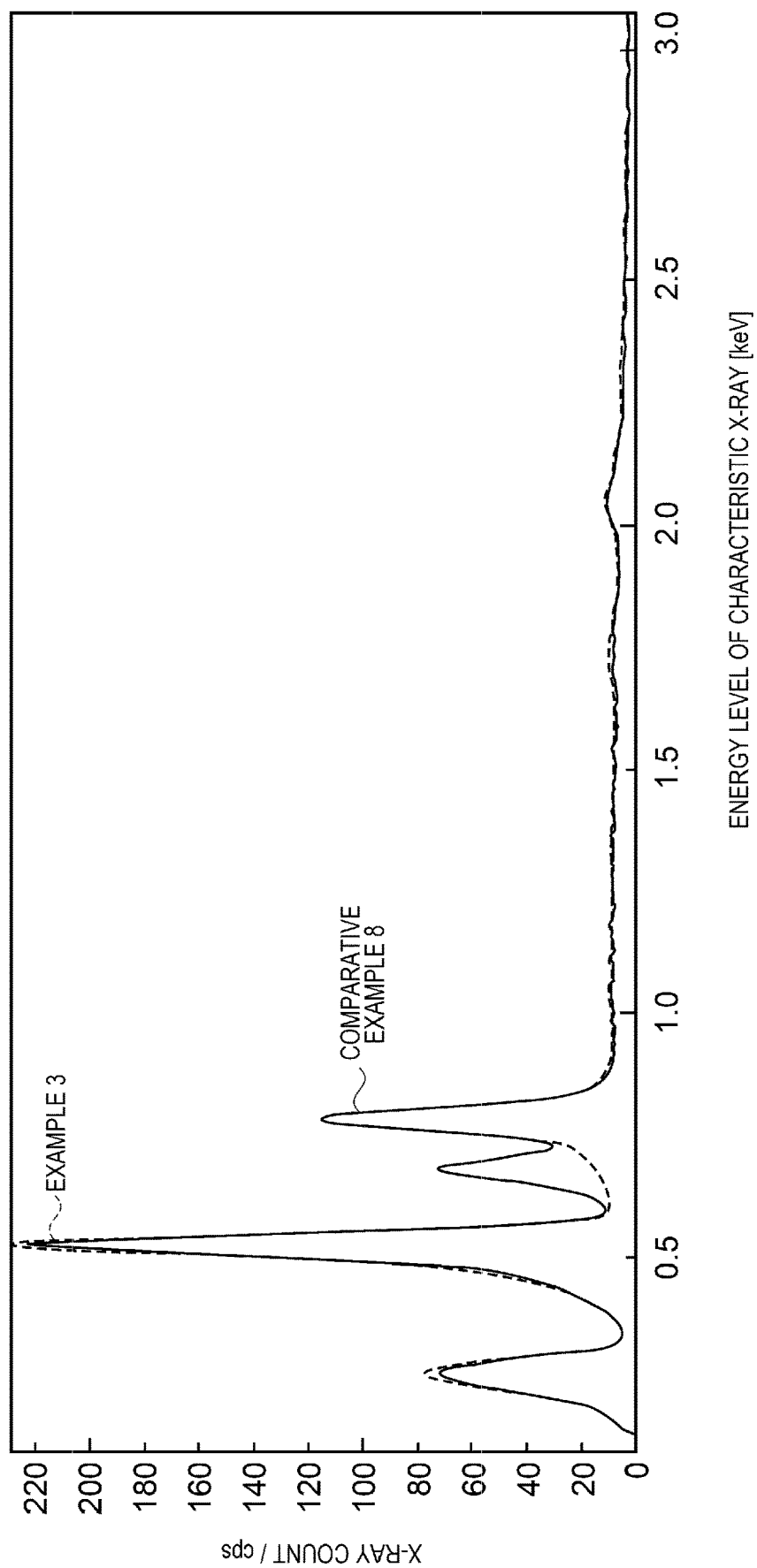
FIG. 14 is a diagram showing EDS qualitative analysis charts of Example 8 and Comparative Example 3.

Evaluation results of the solid electrolyte pellets of Examples and Comparative Examples will be described with reference to FIGS. 11, 12, 13, and 14. FIG. 11 is a table showing compositions and lithium ion conductivities of the electrolytes according to Examples and Comparative Examples. FIG. 12 is a diagram showing X-ray diffraction charts of Example 8 and Comparative Example 3. FIG. 13 is a diagram showing Raman scattering spectra of Example 8 and Comparative Example 3. FIG. 14 is a diagram showing EDS qualitative analysis charts of Example 8 and Comparative Example 3. The electrolytes shown in FIG. 11 are electrolytes contained in the electrolyte portions when producing lithium-ion batteries. Evaluation of the solid electrolyte pellet described below is evaluation of the electrolyte in the electrolyte portion.

2.2.6.1. XRD Analysis

With respect to the solid electrolyte pellets of Examples and Comparative Examples, X-ray diffraction (XRD) analysis was performed. Specifically, the presence or absence of impurities contained in the electrolyte was examined using an X-ray diffractometer MRD of Philips Ltd. Among the obtained results, X-ray diffraction charts of Example 8 and Comparative Example 3 are shown in FIG. 12 as representative examples. In FIG. 12, the horizontal axis represents 2θ as the X-ray diffraction angle, and the vertical axis represents a diffraction intensity (Intensity/a.u.).

As shown in FIG. 12, in the X-ray diffraction charts of Example 8 and Comparative Example 3, impurities, etc. were not observed, and it was found that the target electrolytes are produced. Also in Examples other than Example 8 and Comparative Examples other than Comparative Example 3, impurities were similarly not observed.

2.2.6.2. Raman Scattering Analysis

With respect to the solid electrolyte pellets of Example 8 and Comparative Example 3, Raman scattering spectra were obtained using a Raman spectrometer S-2000 of JEOL Ltd., and crystal structures were confirmed. As the obtained results, Raman scattering spectra of Example 8 and Comparative Example 3 are shown in FIG. 13. In FIG. 13, the horizontal axis represents a Raman shift, and the vertical axis represents an intensity (Intensity/a.u.). Note that on the vertical axis, the intensity increases upward in FIG. 13.

As shown in FIG. 13, a difference was not observed between the Raman scattering spectrum of Example 8 shown by a solid line and the Raman scattering spectrum of Comparative Example 3 shown by a broken line. That is, it was found that Example 8 and Comparative Example 3 have the same crystal structure.

2.2.6.3. Elemental Analysis

With respect to the solid electrolyte pellets of Example 8 and Comparative Example 3, elements contained in the electrolytes were examined by elemental qualitative analysis using SEM-EDS. As the obtained results, EDS qualitative analysis charts of Example 8 and Comparative Example 3 are shown in FIG. 14. In FIG. 14, the horizontal axis represents an energy level of a characteristic X-ray emitted from the solid electrolyte pellet serving as a sample, and the vertical axis represents an X-ray count.

As shown in FIG. 14, in the EDS qualitative analysis chart of Example 8 shown by a solid line, an apparent peak of a K-line of fluorine (F) is observed at 0.677 keV. On the other hand, in the EDS qualitative analysis chart of Comparative Example 3, an apparent peak of a K-line of fluorine (F) is not observed.

From the results of the XRD analysis, the Raman scattering analysis, and the elemental analysis described above, it was shown that although the electrolyte of Example 8 has the same crystal structure as that of the electrolyte of Comparative Example 3, fluorine (F) is introduced into the crystal. That is, it was found that in the electrolytes of Examples, the electrolyte represented by the compositional formula (1) is formed.

2.2.6.4. Lithium Ion Conduction Property

With respect to the solid electrolyte pellets of Examples and Comparative Examples, as an index of the lithium ion conduction property, the lithium ion conductivity was evaluated by the same method as in the first embodiment. In any of the solid electrolyte pellets of Examples and Comparative Examples, the grain bulk component and the grain boundary component were integrated and could not be separated. Therefore, in FIG. 11, only the total ion conductivity was calculated and shown.

Here, in order to confirm the grain bulk conductivity, the following experiment was performed. First, by using the ground calcined body of Example 8, a heating treatment was performed at 900° C. for 1.5 hours while applying a pressure of 0.030 kN/mm$^2$ (30 MPa) by a hot press method. This was gradually cooled to about 20° C., and then taken out from the molding die, and was further subjected to a heating treatment at 900° C. for 8 hours. The bulk density of the obtained pellet was 95% or more. AC impedance measurement was performed for the pellet in the same manner as described above, and as a result, the total ion conductivity was $1.3 \times 10^{-3}$ S/cm. From this result, the grain bulk conductivity of the solid electrolyte pellet of Example 8 is presumed to be $1.3 \times 10^{-3}$ S/cm. In addition, the grain bulk conductivities of the solid electrolyte pellets of Example 9 to Example 12 and Comparative Example 3 are also presumed to be $1.3 \times 10^{-3}$ S/cm.

As shown in FIG. 11, in the solid electrolyte pellets of Example 8 to Example 12, the total ion conductivity was $2.4 \times 10^{-4}$ S/cm or more and exceeded $1.5 \times 10^{-4}$ S/cm. In particular, also in Example 12 in which 0.5 mol of oxygen (O) of the lithium composite metal oxide of the compositional formula (2) was substituted with fluorine (F), a favorable value was obtained. From these results, it was shown that substitution of oxygen (O) with fluorine (F) in the lithium composite metal oxide of the compositional formula (1) should be carried out at 1.0 mol or less. From the above result, it was shown that in the electrolyte of this embodiment, the grain boundary resistance of crystal grains is decreased and the lithium ion conduction property is improved.

On the other hand, in the solid electrolyte pellets of Comparative Example 3 to Comparative Example 5, the total ion conductivity was less than $1.5 \times 10^4$ S/cm. In particular, in Comparative Example 4 in which 5 mol of oxygen (O) of the lithium composite metal oxide of the compositional formula (2) was substituted with fluorine (F) and in Comparative Example 5 in which 1.5 mol of oxygen (O) was substituted with fluorine (F), the total ion conductivity was $1.5 \times 10^{-6}$ S/cm or less. From these results, it was found that the electrolytes of Comparative Example 3 to Comparative Example 5 have a poorer lithium ion conduction property than the electrolytes of Examples.

3. Third Embodiment 3.1. Method for Producing Battery

Figure 15:
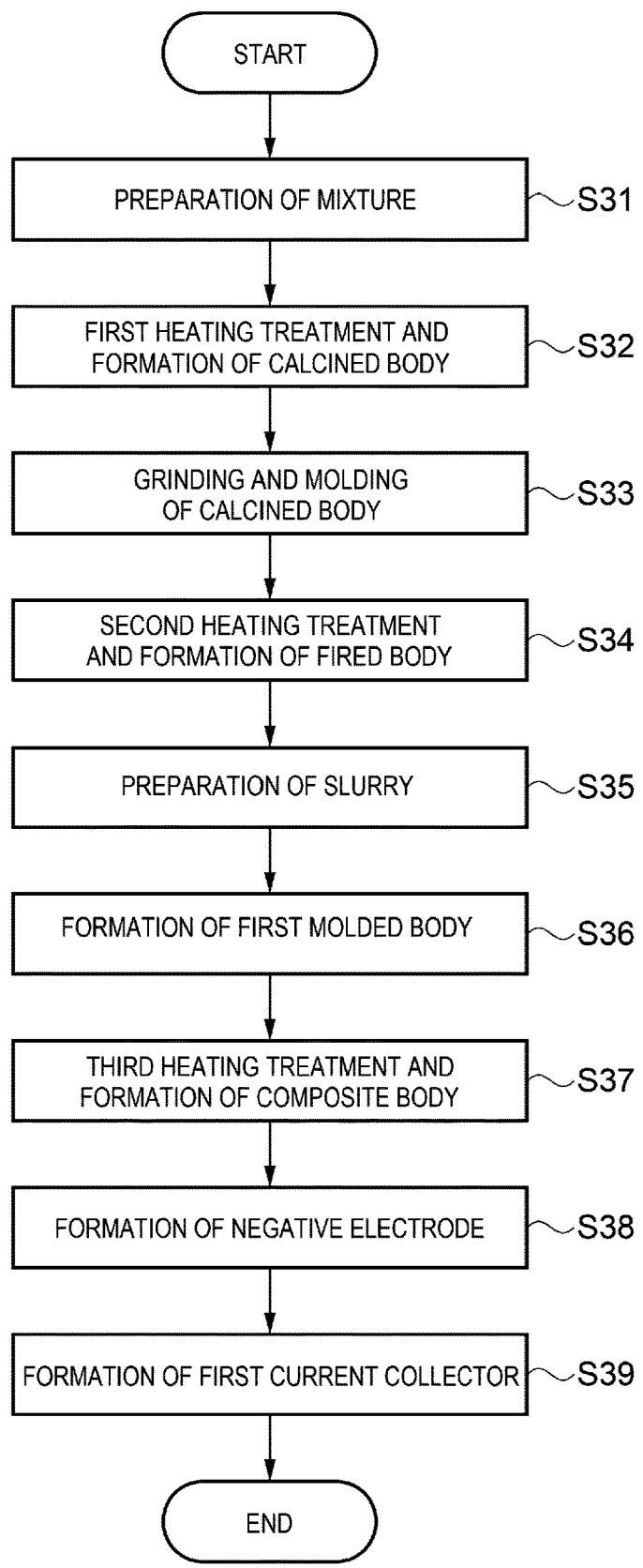
FIG. 15 is a process flow diagram showing a method for producing a lithium-ion battery as a battery according to a third embodiment.

A method for producing a battery according to this embodiment will be described with reference to FIG. 15. In this embodiment, an explanation will be given by showing a lithium-ion battery as an example of the battery. FIG. 15 is a process flow diagram showing a method for producing a lithium-ion battery as the battery according to a third embodiment. The process flow shown in FIG. 15 is an example and the method is not limited thereto. Further, the same constituent portions as in the above-mentioned embodiments are denoted by the same reference numerals and a repeated description thereof will be omitted.

As shown in FIG. 15, the method for producing a lithium-ion battery of this embodiment includes the following steps. In Step S31, a mixture is prepared by mixing a plurality of types of raw materials containing elements constituting a lithium composite metal oxide represented by the following compositional formula (1). In Step S32, a calcined body is formed by subjecting the mixture to a first heating treatment. In Step S33, the calcined body is molded after the calcined body is ground. In Step S34, a fired body is formed by subjecting the molded calcined body to a second heating treatment. In Step S35, a slurry is prepared by grinding the fired body and thereafter mixing the ground fired body with a solvent. In Step S36, a first molded body is formed using an active material. In Step S37, a positive electrode as a composite body including the first molded body and an electrolyte portion containing a crystalline electrolyte is formed by performing a third heating treatment in a state where the slurry and the first molded body are brought into contact with each other. In Step S38, a negative electrode is formed, via an electrolyte layer, at one face of the positive electrode. In Step S39, a first current collector is formed at the other face of the positive electrode.

$$Li_{7-x}La_3(Zr_{2-x}A_x)O_{12-y}F_y \qquad (1)$$

In the formula, $0.1 \leq x \leq 1.0$, $0.0 < y \leq 1.0$, and A represents two or more types of Ta, Nb, and Sb.

Here, in the method for producing a lithium-ion battery of this embodiment, the method for producing the electrolyte 3b in the first embodiment is included. That is, a method for producing an electrolyte of this embodiment includes a step of preparing a mixture by mixing a plurality of types of raw materials containing elements constituting a lithium composite metal oxide of the compositional formula (1), a step of forming a calcined body by subjecting the mixture to a first heating treatment, and a step of forming a crystalline electrolyte as a fired body by subjecting the calcined body to a second heating treatment.

These steps included in the method for producing an electrolyte are included in Step S31 to Step S34 in the method for producing a lithium-ion battery of this embodiment. In this embodiment, an explanation will be given by showing a method for producing an electrolyte using a liquid phase method as an example, but the method is not limited thereto. For example, the plurality of types of raw materials containing elements constituting a lithium composite metal oxide of the compositional formula (1) may be used as a mixture in a powder form.

3.1.1. Preparation of Mixture

In Step S31, a mixture is prepared in the same manner as in Step S1 in the first embodiment. As the compounds containing elements constituting a lithium composite metal oxide of the compositional formula (1) and the solvent to be used in the mixture, the same ones as those in the first embodiment can be adopted. Then, the process proceeds to Step S32.

3.1.2. First Heating Treatment and Formation of Calcined Body

In Step S32, a calcined body is formed by subjecting the mixture to a first heating treatment in the same manner as in Step S12 in the second embodiment. Then, the process proceeds to Step S33.

3.1.3. Grinding and Molding of Calcined Body

In Step S33, the calcined body is formed into a powder by grinding the calcined body in the same manner as the grinding and mixing of the calcined body in Step S12 in the second embodiment. Subsequently, the calcined body in a powder form is molded into a circular disk shape in the same manner as shown in FIG. 4B in the first embodiment. The shape of the molded calcined body is not particularly limited, but is set to, for example, 10 mm in diameter, 8 mm in effective diameter, and 150 μm in thickness.

3.1.4. Second Heating Treatment and Formation of Fired Body

In Step S34, a fired body is formed by subjecting the molded calcined body to a second heating treatment. Step S34 is performed in the same manner as the second heating treatment for the circular disk-shaped molded material of the second mixture and the formation of a fired body in Step S14 in the second embodiment. Then, the process proceeds to Step S35.

3.1.5. Preparation of Slurry to Formation of First Current Collector

Step S35 to Step S39 are performed in the same manner as Step S15 to Step S19 in the second embodiment. By undergoing the above-mentioned steps, the lithium-ion battery of this embodiment is produced.

As described above, by the method for producing a lithium-ion battery according to the third embodiment, the same effects as those of the first embodiment can be obtained.

4. Fourth Embodiment 4.1. Method for Producing Battery

Figure 16:
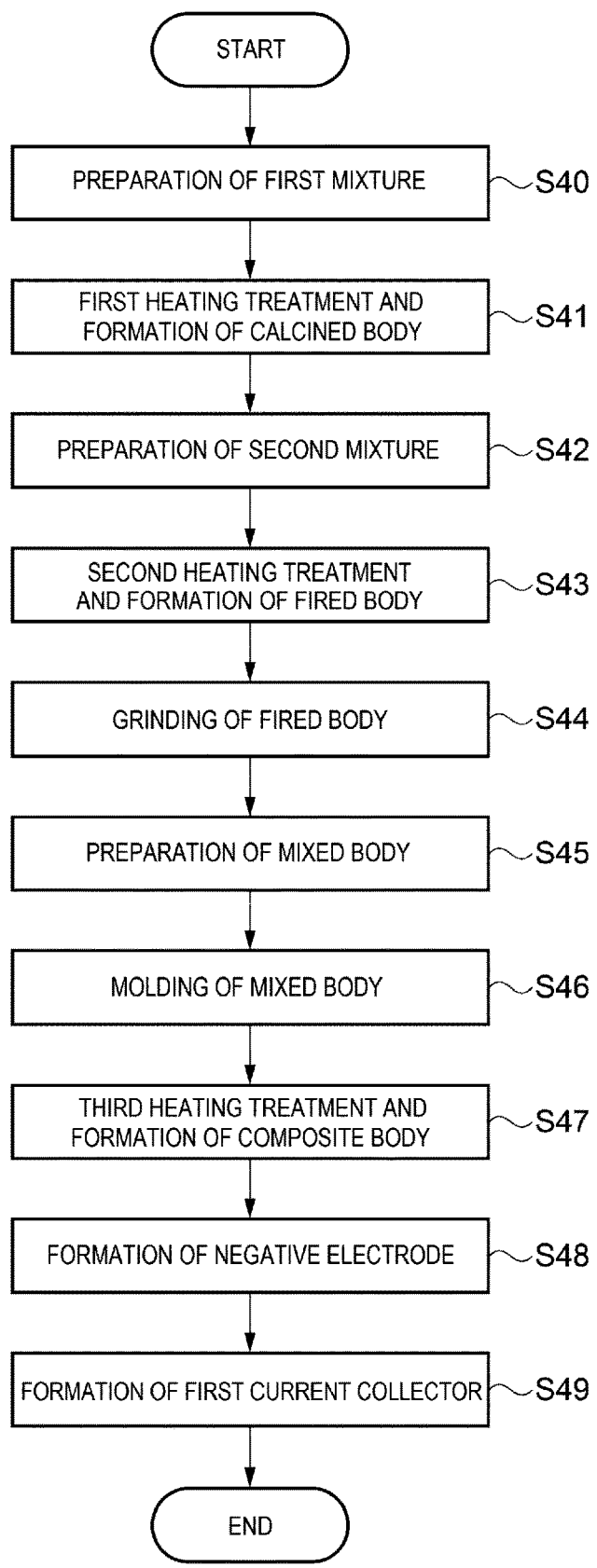
FIG. 16 is a process flow diagram showing a method for producing a lithium-ion battery as a battery according to a fourth embodiment.

A method for producing a battery according to this embodiment will be described with reference to FIG. 16. In this embodiment, an explanation will be given by showing a lithium-ion battery as an example of the battery. FIG. 16 is a process flow diagram showing a method for producing a lithium-ion battery as the battery according to a fourth embodiment. The process flow shown in FIG. 16 is an example and the method is not limited thereto. Further, the same constituent portions as in the above-mentioned embodiments are denoted by the same reference numerals and a repeated description thereof will be omitted.

As shown in FIG. 16, the method for producing a lithium-ion battery of this embodiment includes the following steps. In Step S40, a first mixture is prepared by mixing a plurality of types of raw materials containing elements constituting a lithium composite metal oxide represented by the following compositional formula (2). In Step S41, a calcined body is formed by subjecting the first mixture to a first heating treatment. In Step S42, a second mixture is prepared by mixing the calcined body with a fluorine-containing inorganic compound. In Step S43, a fired body is formed by subjecting the second mixture to a second heating treatment. In Step S44, a powder is formed by grinding the fired body. In Step S45, a mixed body is prepared by mixing the powder with an active material. In Step S46, the mixed body is molded into a desired shape. In Step S47, a positive electrode as a composite body including the active material and an electrolyte portion containing a crystalline electrolyte is formed by subjecting the molded mixed body to a third heating treatment. In Step S48, a negative electrode is formed, via an electrolyte layer, at one face of the positive electrode. In Step S49, a first current collector is formed at the other face of the positive electrode.

$$Li_{7-x}La_3(Zr_{2-x}A_x)O_{12} \qquad (2)$$

In the formula, $0.1 \leq x \leq 1.0$, and A represents two or more types of Ta, Nb, and Sb.

Here, in the method for producing a lithium-ion battery of this embodiment, the following method for producing an electrolyte is included. That is, the method for producing an electrolyte of this embodiment includes a step of preparing a first mixture by mixing a plurality of types of raw materials containing elements constituting a lithium composite metal oxide of the compositional formula (2), a step of forming a calcined body by subjecting the first mixture to a first heating treatment, a step of preparing a second mixture by mixing the calcined body with a fluorine-containing inorganic compound, and a step of forming a crystalline electrolyte by subjecting the second mixture to a second heating treatment. These steps included in the method for producing an electrolyte of this embodiment are included in Step S40, Step S41, Step S42, and Step S43 in the method for producing a lithium-ion battery described above.

The method for producing a battery of this embodiment is different from the method for producing a battery of the second embodiment in that a mixed body is formed from an electrolyte as a fired body and an active material without forming a first molded body of the active material, and the others are the same. Therefore, in the following description, an explanation of the steps common to the second embodiment will be omitted.

4.1.1. Preparation of First Mixture to Second Heating Treatment and Formation of Fired Body The preparation of a first mixture in Step S40 to the second heating treatment and the formation of a fired body in Step S43 are performed in the same manner as in Step S11 to Step S14 in the second embodiment. Then, the process proceeds to Step S44.

4.1.2. Grinding of Fired Body

In Step S44, in the same manner as shown in FIG. 9B in Step S12 in the second embodiment, the fired body is sufficiently ground and mixed to form a powder using an agate mortar 93 and an agate pestle 94. The average particle diameter of the fired body in a powder form is preferably set to 0.1 μm or more and 5 μm or less, and is more preferably 0.3 μm or more and 1 μm or less. By adjusting the average particle diameter of the fired body in a powder form, the bulk density can be adjusted in the electrolyte portion. The average particle diameter of the fired body in a powder form can be measured by the above-mentioned method. In order to adjust the average particle diameter of the fired body, a classification operation may be performed using a wet-type centrifuge or the like. Then, the process proceeds to Step S45.

4.1.3. Preparation of Mixed Body

In Step S45, a mixed body in a powder form is prepared by mixing the fired body with an active material. As the active material, the same forming material as in the first embodiment can be adopted. Then, the process proceeds to Step S46.

4.1.4. Molding of Mixed Body

In Step S46, the mixed body in a powder form is molded by compression molding. For details, a mixed body is molded in the same manner as the formation of the first molded body in Step S16 in the second embodiment. Specifically, by using a die with an exhaust port having an inner diameter of 10 mm as the molding die 86 as shown in FIG. 4B, the mixed body in a powder form is pressed at a pressure of 624 MPa (0.624 kN/mm$^2$) for 2 minutes, whereby a circular disk-shaped molded material of the mixed body is prepared. The shape of the circular disk-shaped molded material is not particularly limited, but is set to, for example, 10 mm in diameter, 8 mm in effective diameter, and 150 μm in thickness. Here, an electrolyte layer may be formed by applying the fired body in a powder form to one face of the circular disk-shaped molded material and molding the fired body. Then, the process proceeds to Step S47.

4.1.5. Third Heating Treatment and Formation of Composite Body

In Step S47, the circular disk-shaped molded material of the mixed body is subjected to a third heating treatment. In the third heating treatment, the heating temperature is set to 800° C. or higher and 1000° C. or lower. The third heating treatment is performed in the same manner as shown in FIG. 4D in the first embodiment. The third heating treatment may be performed in a dry atmosphere, an oxidizing atmosphere, or an inert gas atmosphere. The time of the third heating treatment is not particularly limited, but is, for example, 2 hours or more and 36 hours or less. The resulting material is gradually cooled to room temperature after the third heating treatment. By the third heating treatment, a composite body in which the electrolyte portion containing the electrolyte and the active material portion composed of the active material are combined is formed. The electrolyte as used herein contains a lithium composite metal oxide of the compositional formula (1).

In this manner, the positive electrode as the composite body in which the active material portion and the electrolyte portion are combined is obtained. When the electrolyte layer is not formed in Step S46, the electrolyte layer is formed here. In this embodiment, the positive electrode is formed from the mixed body in a powder form by compression molding and the third heating treatment. Therefore, on one face and the other face of the circular disk-shaped positive electrode, particles of the active material or the electrolyte are exposed, so that the faces have irregularities. Further, also when the electrolyte layer is formed simultaneously with the positive electrode, the surface of the electrolyte layer has irregularities due to the particles of the electrolyte. Then, the process proceeds to Step S48.

4.1.6. Formation of Negative Electrode and First Current Collector

The formation of the negative electrode in Step S48 and the formation of the first current collector in Step S49 are performed in the same manner as in Step S18 and Step S19 in the second embodiment. By undergoing the above-mentioned steps, the lithium-ion battery of this embodiment is produced.

As described above, by the method for producing a lithium-ion battery according to the fourth embodiment, in addition to the effects of the second embodiment, the following effect can be obtained. The composite body is produced from the powder of the fired body and the active material by molding the mixed body. Therefore, the production process can be simplified as compared with a case where the molded body of the active material is prepared.

5. Fifth Embodiment 5.1. Method for Producing Battery

Figure 17:
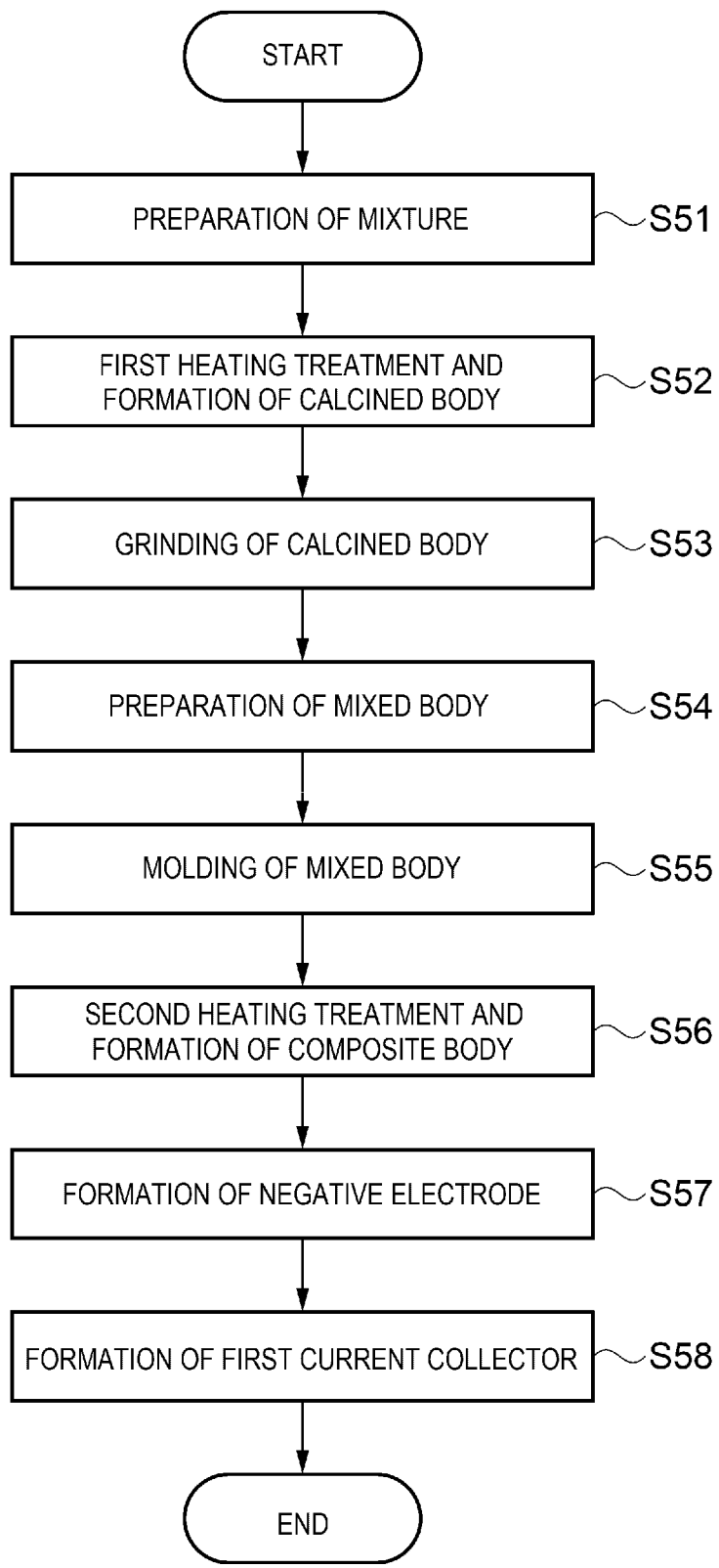
FIG. 17 is a process flow diagram showing a method for producing a lithium-ion battery as a battery according to a fifth embodiment.

A method for producing a battery according to this embodiment will be described with reference to FIG. 17. In this embodiment, an explanation will be given by showing a lithium-ion battery as an example of the battery. FIG. 17 is a process flow diagram showing a method for producing a lithium-ion battery as the battery according to a fifth embodiment. The process flow shown in FIG. 17 is an example and the method is not limited thereto. Further, the same constituent portions as in the above-mentioned embodiments are denoted by the same reference numerals and a repeated description thereof will be omitted.

As shown in FIG. 17, the method for producing a lithium-ion battery of this embodiment includes the following steps. In Step S51, a mixture is prepared by mixing a plurality of types of raw materials containing elements constituting a lithium composite metal oxide represented by the following compositional formula (1). In Step S52, a calcined body is formed by subjecting the mixture to a first heating treatment. In Step S53, a powder is formed by grinding the calcined body. In Step S54, a mixed body is prepared by mixing the powder with an active material. In Step S55, the mixed body is molded. In Step S56, a positive electrode as a composite body including the active material and an electrolyte portion containing a crystalline electrolyte is formed by subjecting the molded mixed body to a second heating treatment. In Step S57, a negative electrode is formed, via an electrolyte layer, at one face of the positive electrode. In Step S58, a first current collector is formed at the other face of the positive electrode.

$$Li_{7-x}La_3(Zr_{2-x}A_x)O_{12-y}F_y \qquad (1)$$

In the formula, 0.1≤x≤1.0, 0.0<y≤1.0, and A represents two or more types of Ta, Nb, and Sb.

Here, in the method for producing a lithium-ion battery of this embodiment, the following method for producing an electrolyte is included. That is, the method for producing an electrolyte of this embodiment includes a step of preparing a mixture by mixing a plurality of types of raw materials containing elements constituting a lithium composite metal oxide of the compositional formula (1), a step of forming a calcined body by subjecting the mixture to a first heating treatment, and a step of forming a crystalline electrolyte by subjecting the calcined body to a second heating treatment. These steps included in the method for producing an electrolyte of this embodiment are included in Step S51, Step S52, Step S53, and Step S56 in the method for producing a lithium-ion battery described above.

The method for producing a battery of this embodiment is different from the method for producing a battery of the fourth embodiment in that a mixed body is formed using a calcined body of an electrolyte containing a lithium composite metal oxide of the compositional formula (1) and an active material. Therefore, in the following description, an explanation of the steps common to the fourth embodiment will be omitted.

5.1.1. Preparation of Mixture

In Step S51, a mixture in a liquid state is prepared by dissolving precursors as the raw materials of the electrolyte in a solvent to prepare solutions, and thereafter mixing the solutions. That is, the mixture contains a solvent for dissolving the raw materials. As the raw materials, compounds containing elements constituting a lithium composite metal oxide of the compositional formula (1) are used. For details, Step S51 is performed in the same manner as Step S1 in the first embodiment. Then, the process proceeds to Step S52.

5.1.2. First Heating Treatment and Formation of Calcined Body

In Step S52, a calcined body is formed by subjecting the mixture in a liquid state to a first heating treatment. Step S52 is performed in the same manner as the first heating treatment for the first mixture and the formation of the calcined body in Step S12 in the second embodiment. Then, the process proceeds to Step S53.

5.1.3. Grinding of Calcined Body

In Step S53, the calcined body is formed into a powder by sufficiently grinding and mixing the calcined body using an agate mortar 93 and an agate pestle 94 in the same manner as shown in FIG. 9B in Step S12 in the second embodiment. The average particle diameter of the calcined body in a powder form is preferably set to 0.1 µm or more and 5 µm or less, and is more preferably 0.3 µm or more and 1 µm or less. By adjusting the average particle diameter of the calcined body in a powder form, the bulk density can be adjusted in the electrolyte portion. The average particle diameter of the calcined body in a powder form can be measured by the above-mentioned method. In order to adjust the average particle diameter of the calcined body, a classification operation may be performed using a wet-type centrifuge or the like. Then, the process proceeds to Step S54.

5.1.4. Preparation of Mixed Body to Formation of First Current Collector

Step S54 is performed in the same manner as Step S45 of the fourth embodiment except that the calcined body in a powder form is used in place of the fired body in the fourth embodiment. The subsequent Step S55 is performed in the same manner as Step S46 in the fourth embodiment. The subsequent Step S56 is performed in the same manner as in the fourth embodiment except that the second heating treatment is performed in place of the third heating treatment in the fourth embodiment. The condition of the second heating treatment is set in the same manner as in Step S14 in the second embodiment. The subsequent Step S57 and Step S58 are performed in the same manner as Step S48 and Step S49 in the fourth embodiment. By undergoing the above-mentioned steps, the lithium-ion battery of this embodiment is produced.

As described above, by the method for producing a lithium-ion battery according to the fifth embodiment, in addition to the effects of the second embodiment, the following effect can be obtained. The composite body is produced from the powder obtained by grinding the calcined body and the active material by molding the mixed body. Therefore, the production process can be simplified as compared with a case where the molded body of the active material is prepared.

6. Sixth Embodiment 6.1. Method for Producing Battery

Figure 18A:
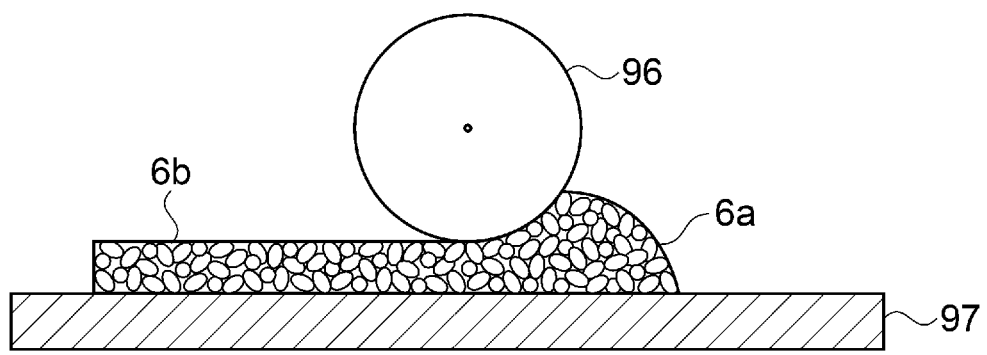
FIG. 18A is a schematic view showing a method for producing a lithium-ion battery according to a sixth embodiment.
Figure 18B:
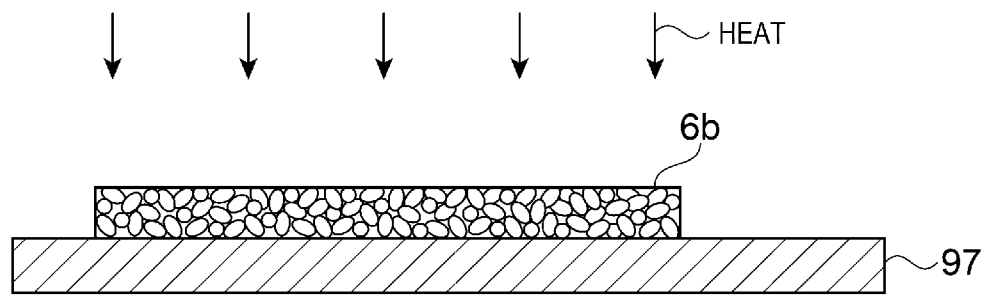
FIG. 18B is a schematic view showing the method for producing a lithium-ion battery.

A method for producing a battery according to this embodiment will be described using FIGS. 18A and 18B. In this embodiment, an explanation will be given by showing a lithium-ion battery as an example of the battery. FIGS. 18A and 18B are each a schematic view showing a method for producing a lithium-ion battery according to a sixth embodiment. The same constituent portions as in the above-mentioned embodiments are denoted by the same reference numerals and a repeated description thereof will be omitted.

In the method for producing a battery of this embodiment, in a step of preparing a mixed body corresponding to Step S54 in the fifth embodiment, a slurry as a mixed body including a powder of a calcined body, an active material, and a solvent is prepared. That is, in this embodiment, in steps corresponding to Step S54 and Step S55 in the fifth embodiment, a green sheet method is adopted. This embodiment is different from the fifth embodiment in this point, and the other steps are performed in the same manner as in the fifth embodiment. Therefore, in this embodiment, only a step of preparing a mixed body and a step of molding the mixed body will be described, and a description of the other steps will be omitted.

6.1.1. Preparation of Slurry

In the step of preparing a slurry as a mixed body, a slurry is prepared by mixing a ground calcined body in a powder form, an active material, and a solvent in the same manner as in Step S53 in the fifth embodiment. As the active material and the solvent, the above-mentioned compounds can be adopted. Specifically, the preparation is performed in the same manner as shown in FIG. 4A in Step S1. Then, the process proceeds to the step of molding the slurry as the mixed body.

6.1.2. Molding of Slurry

In the step of molding the slurry, as shown in FIG. 18A, a slurry 6a is molded into a molded body 6b in a sheet form by being coated on a base material 97 using a coating machine 96 such as a bar coater. At this time, the thickness of the molded body 6b is regulated so that the thickness of the positive electrode as the composite body to be finally formed is 30 µm or more and 150 µm or less. The thickness of the molded body 6b can be appropriately changed in accordance with the solid component concentration in the slurry 6a, the performance of the coating machine 96, or the like.

Subsequently, as shown in FIG. 18B, the solvent and the like used in the slurry are volatilized by heating the molded body 6b. A heating temperature at this time is appropriately set according to the boiling point of the solvent, vapor pressure, or the like. Thereafter, the molded body 6b is detached from the base material 97 and processed into a desired shape, for example, a circular disk shape having a diameter of about 8.4 mm. Thereafter, the processed molded body 6b is subjected to a second heating treatment in the same manner as in Step S56 in the fifth embodiment, whereby a positive electrode as a composite body is formed. Here, an electrolyte layer is formed at one face of the positive electrode by a known method. The steps thereafter are performed in the same manner as in the fifth embodiment. By undergoing the above-mentioned steps, the lithium-ion battery of this embodiment is produced.

In this embodiment, a green sheet method is adopted for the fifth embodiment, however, the method is not limited thereto. A green sheet method may be adopted for the fourth embodiment. For details, in Step S45 in the fourth embodiment, the slurry as the mixed body is prepared, and in the subsequent Step S46, the molded body may be molded according to the above-mentioned procedure.

As described above, by the method for producing a lithium-ion battery according to the sixth embodiment, in addition to the effects of the fifth embodiment, the following effect can be obtained. Since the mixed body is a slurry, it becomes easy to handle the mixed body as compared with a case where the mixed body is a powder. In addition, it becomes easy to mold the mixed body into an arbitrary shape.

7. Seventh Embodiment

7.1. Electronic Apparatus

Figure 19:
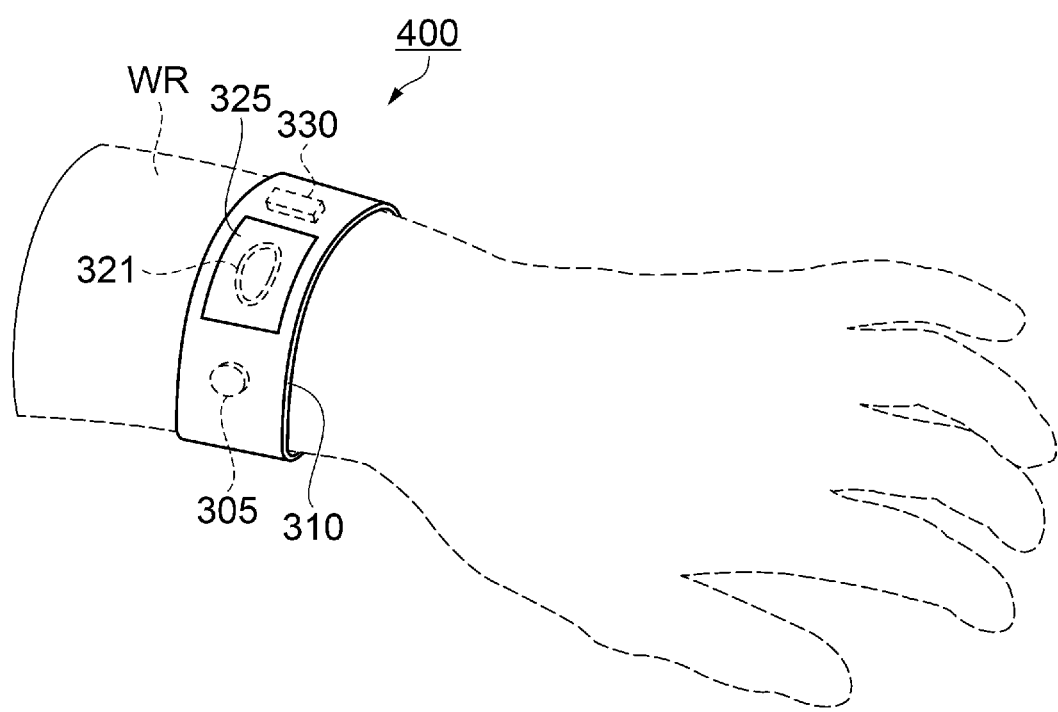
FIG. 19 is a schematic view showing a configuration of a wearable apparatus according to a seventh embodiment.

An electronic apparatus according to this embodiment will be described with reference to FIG. 19. In this embodiment, an explanation will be given by showing a wearable apparatus as an example of the electronic apparatus. FIG. 19 is a schematic view showing a configuration of a wearable apparatus as the electronic apparatus according to the seventh embodiment.

As shown in FIG. 19, a wearable apparatus 400 of this embodiment is an information apparatus that is worn on, for example, the wrist WR of a human body using a band 310 like a watch, and that obtains information on the human body. The wearable apparatus 400 includes a battery 305, a display portion 325, a sensor 321, and a processing portion 330. As the battery 305, the lithium-ion battery of the above-mentioned embodiment is used.

The band 310 has a belt-like shape using a resin having flexibility such as rubber so as to come into close contact with the wrist WR when it is worn. In an end portion of the band 310, a binding portion (not shown) capable of adjusting the binding position according to the circumference of the wrist WR is provided.

The sensor 321 is disposed in the band 310 at the wrist WR side that is an inner face side of the band 310 so as to come into contact with the wrist WR when it is worn. The sensor 321 obtains information on the pulse rate, the blood glucose level, or the like of the human body when it comes into contact with the wrist WR, and outputs the information to the processing portion 330. As the sensor 321, for example, an optical sensor is used.

The processing portion 330 is incorporated in the band 310, and is electrically coupled to the sensor 321 and the display portion 325. As the processing portion 330, for example, an integrated circuit is used. The processing portion 330 performs arithmetic processing of the pulse rate, the blood glucose level, or the like based on the output from the sensor 321, and outputs display data to the display portion 325.

The display portion 325 displays the display data such as the pulse rate or the blood glucose level output from the processing portion 330. As the display portion 325, for example, a light-receiving type liquid crystal display device is used. The display portion 325 is disposed at an outer face side of the band 310, in other words, at a side opposed to the inner face where the sensor 321 is disposed so that a wearer can read the display data when the wearer wears the wearable apparatus 400.

The battery 305 functions as a power supply source supplying power to the display portion 325, the sensor 321, and the processing portion 330. The battery 305 is incorporated in the band 310.

According to the above configuration, the wearable apparatus 400 can obtain information on the pulse rate or the blood glucose level of a wearer from the wrist WR and can display it as information such as the pulse rate or the blood glucose level through arithmetic processing or the like. Further, to the wearable apparatus 400, the lithium-ion battery of the above-mentioned embodiment having an improved lithium ion conduction property and a large battery capacity in spite of being small in size is applied, and therefore, the weight can be reduced, and the operating time can be extended. In addition, since the lithium-ion battery of the above-mentioned embodiment is an all-solid-state secondary battery, the battery can be repeatedly used by charging, and also there is no concern about leakage of an electrolytic solution or the like, and therefore, the wearable apparatus 400 that can be used safely for a long period of time can be provided.

In this embodiment, a watch-type wearable apparatus is illustrated as the wearable apparatus 400, however, the apparatus is not limited thereto. The wearable apparatus may be a wearable apparatus to be worn on, for example, the ankle, head, ear, waist, or the like.

The electronic apparatus to which the battery 305, that is, the lithium-ion battery of the above-mentioned embodiment is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like can be exemplified. These electronic apparatuses may have another function, for example, a data communication function, a gaming function, a recording and playback function, a dictionary function, or the like.

Further, the electronic apparatus of this embodiment is not limited to those for general consumers, but can also be applied to industrial use. In addition, the apparatus to which the lithium-ion battery of the above-mentioned embodiment is applied is not limited to electronic apparatuses. For example, the lithium-ion battery of the above-mentioned embodiment may be applied as a power supply source for a moving object. Specific examples of the moving object include automobiles such as HEV (Hybrid Electric Vehicle), PHEV (Plug-in Hybrid Electric Vehicle), EV (Electric Vehicle), and FCV (Fuel Cell Vehicle), electric motorcycles, electric bicycles, electric wheelchairs, forklifts, and flying objects such as unmanned planes. According to this, a moving object including a battery having an improved lithium ion conduction property as a power supply source can be provided.

Hereinafter, contents derived from the embodiments will be described.

An electrolyte contains a lithium composite metal oxide represented by the following compositional formula (1).

$$Li_{7-x}La_3(Zr_{2-x}A_x)O_{12-y}F_y \qquad (1)$$

In the formula, $0.1 \leq x \leq 1.0$, $0.0 < y \leq 1.0$, and A represents two or more types of Ta, Nb, and Sb.

According to this configuration, even if firing is performed at 1000° C. or lower that is a relatively low temperature for the firing temperature, the grain boundary resistance of crystal grains can be decreased and also the lithium ion conduction property can be improved. For details, fluorine (F) having a relatively high electronegativity is introduced into the lithium composite metal oxide of the compositional formula (1). Therefore, insertion and extraction of lithium ions in the electrolyte are accelerated and also a highly oxidized state of a transition metal such as lanthanum (La), tantalum (Ta), or niobium (Nb) is stabilized. As a result, the electrochemical property and thermochemical property of the electrolyte are improved so that the grain boundary resistance is decreased, and also the lithium ion conduction property is improved. In addition, since zirconium (Zr) is partially substituted with two or more types of tantalum (Ta), niobium (Nb), and antimony (Sb), the lithium ion conduction property is further improved as compared with a case where zirconium is not partially substituted with such an element. Accordingly, even if firing is performed at a low temperature of 1000° C. or lower, the electrolyte in which the grain boundary resistance is decreased as compared with the related art and the lithium ion conduction property is improved can be provided.

A battery includes a composite body including the electrolyte described above and an active material, an electrode provided at one face of the composite body, and a current collector provided at another face opposite to the one face of the composite body.

According to this configuration, the electrolyte in which the grain boundary resistance is decreased and the lithium ion conduction property is improved is used, and therefore, a battery having improved charge-discharge characteristics can be formed.

In the battery described above, the active material may be a positive electrode active material containing Li and O.

According to this configuration, the positive electrode active material serving as a lithium supply source is included, and therefore, the charge-discharge characteristics can be further improved. In addition, the capacity of the battery can be increased as compared with the related art.

In the battery described above, the electrode may be metallic Li.

According to this configuration, the lithium supply source is increased so that the capacity of the battery can be increased as compared with a case where the electrode is constituted by a material other than metallic lithium (Li).

An electronic apparatus includes the battery described above.

According to this configuration, an electronic apparatus including the battery having improved charge-discharge characteristics, a small size, and high quality as a power supply source can be provided.

A method for producing an electrolyte includes preparing a mixture by mixing a plurality of types of raw materials containing elements constituting a lithium composite metal oxide represented by the following compositional formula (1), forming a calcined body by subjecting the mixture to a first heating treatment, and forming a crystalline electrolyte by subjecting the calcined body to a second heating treatment.

$$Li_{7-x}La_3(Zr_{2-x}A_x)O_{12-y}F_y \qquad (1)$$

In the formula, $0.1 \leq x \leq 1.0$, $0.0 < y \leq 1.0$, and A represents two or more types of Ta, Nb, and Sb.

According to this configuration, a lithium composite metal oxide represented by the compositional formula (1) is produced from the mixture obtained by mixing the raw materials containing fluorine (F). That is, an electrolyte in which the grain boundary resistance is decreased as compared with the related art and the lithium ion conduction property is improved can be produced. Further, the raw materials containing fluorine (F) are contained in the mixture, and therefore, a step can be omitted as compared with a case where fluorine (F) is introduced after producing a lithium composite metal oxide that does not contain fluorine.

In the method for producing an electrolyte described above, in the preparing the mixture, the mixture containing a fluorine-containing polymer compound as the raw material may be prepared.

According to this configuration, a lithium composite metal oxide of the compositional formula (1) can be produced using a fluorine-containing polymer compound.

In the method for producing an electrolyte described above, in the preparing the mixture, the mixture containing a fluorine-containing inorganic compound as the raw material may be prepared.

According to this configuration, a lithium composite metal oxide of the compositional formula (1) can be produced using a fluorine-containing inorganic compound.

In the method for producing an electrolyte described above, in the preparing the mixture, the mixture in a liquid state may be prepared.

According to this configuration, the mixture is in a liquid state, and therefore, it becomes easy to handle the mixture as compared with a case where the mixture is a powder. Further, when a calcined body is prepared from the mixture, it becomes easy to mold the calcined body into an arbitrary shape.

A method for producing an electrolyte includes preparing a first mixture by mixing a plurality of types of raw materials containing elements constituting a lithium composite metal oxide represented by the following compositional formula (2), forming a calcined body by subjecting the first mixture to a first heating treatment, preparing a second mixture by mixing the calcined body with a fluorine-containing inorganic compound, and forming a crystalline electrolyte by subjecting the second mixture to a second heating treatment.

$$Li_{7-x}La_3(Zr_{2-x}A_x)O_{12} \qquad (2)$$

In the formula, $0.1 \leq x \leq 1.0$, and A represents two or more types of Ta, Nb, and Sb.

According to this configuration, a lithium composite metal oxide containing fluorine can be produced from the second mixture containing a fluorine-containing inorganic compound. That is, an electrolyte in which the grain boundary resistance is decreased as compared with the related art and the lithium ion conduction property is improved can be produced.

In the method for producing an electrolyte described above, a heating temperature in the first heating treatment may be 500° C. or higher and 650° C. or lower, and a heating temperature in the second heating treatment is 800° C. or higher and 1000° C. or lower.

According to this configuration, by the first heating treatment, the solvent or an organic substance such as an impurity is decomposed and reduced. Therefore, in the second heating treatment, a crystalline electrolyte can be formed while increasing the purity. In addition, by setting the temperature in the first heating treatment and the second heating treatment to 1000° C. or lower, the occurrence of a side reaction at a crystal grain boundary or volatilization of lithium can be suppressed. Accordingly, an electrolyte having a further improved lithium ion conduction property can be produced.

A method for producing a battery includes preparing a mixture by mixing a plurality of types of raw materials containing elements constituting a lithium composite metal oxide represented by the following compositional formula (1), forming a calcined body by subjecting the mixture to a first heating treatment, molding the calcined body after grinding the calcined body, forming a fired body by subjecting the molded calcined body to a second heating treatment, preparing a slurry by grinding the fired body and thereafter mixing the ground fired body with a solvent, forming a first molded body using an active material, forming a composite body including the first molded body and an electrolyte portion containing a crystalline electrolyte by performing a third heating treatment in a state where the slurry and the first molded body are brought into contact with each other, and forming a current collector for the composite body.

$$Li_{7-x}La_3(Zr_{2-x}A_x)O_{12-y}F_y \quad (1)$$

In the formula, $0.1 \leq x \leq 1.0$, $0.0 < y \leq 1.0$, and A represents two or more types of Ta, Nb, and Sb.

According to this configuration, a lithium composite metal oxide represented by the compositional formula (1) is produced from the mixture obtained by mixing the raw materials containing fluorine (F). That is, a battery including an electrolyte in which the grain boundary resistance is decreased as compared with the related art and the lithium ion conduction property is improved can be produced.

Since the composite body of the active material and the electrolyte of the compositional formula (1) is formed, the contact area between the active material and the electrolyte is increased as compared with a battery in which the composite body is not formed, and the lithium ion conduction property of the battery is further improved. In addition, the composite body can be easily produced from the first molded body and the slurry.

A method for producing a battery includes preparing a first mixture by mixing a plurality of types of raw materials containing elements constituting a lithium composite metal oxide represented by the following compositional formula (2), forming a calcined body by subjecting the first mixture to a first heating treatment, preparing a second mixture by mixing the calcined body with a fluorine-containing inorganic compound, forming a fired body by subjecting the second mixture to a second heating treatment, preparing a slurry by grinding the fired body and thereafter mixing the ground fired body with a solvent, forming a first molded body using an active material, forming a composite body including the first molded body and an electrolyte portion containing a crystalline electrolyte by performing a third heating treatment in a state where the slurry and the first molded body are brought into contact with each other, and forming a current collector for the composite body.

$$Li_{7-x}La_3(Zr_{2-x}A_x)O_{12} \quad (2)$$

In the formula, $0.1 \leq x \leq 1.0$, and A represents two or more types of Ta, Nb, and Sb.

According to this configuration, a lithium composite metal oxide containing fluorine is produced from the second mixture containing a fluorine-containing inorganic compound. That is, a battery including an electrolyte in which the grain boundary resistance is decreased as compared with the related art and the lithium ion conduction property is improved can be produced.

Since the composite body of the active material and the electrolyte containing fluorine is formed, the contact area between the active material and the electrolyte is increased as compared with a battery in which the composite body is not formed, and the lithium ion conduction property of the battery is further improved. In addition, the composite body can be easily produced from the first molded body and the slurry.

A method for producing a battery includes preparing a mixture by mixing a plurality of types of raw materials containing elements constituting a lithium composite metal oxide represented by the following compositional formula (1), forming a first molded body using an active material, forming a composite body including the first molded body and an electrolyte portion containing a crystalline electrolyte by performing a first heating treatment and a second heating treatment in a state where the mixture and the first molded body are brought into contact with each other, and forming a current collector for the composite body.

$$Li_{7-x}La_3(Zr_{2-x}A_x)O_{12-y}F_y \quad (1)$$

In the formula, $0.1 \leq x \leq 1.0$, $0.0 < y \leq 1.0$, and A represents two or more types of Ta, Nb, and Sb.

According to this configuration, a lithium composite metal oxide represented by the compositional formula (1) is produced from the mixture obtained by mixing the raw materials containing fluorine (F). That is, a battery including an electrolyte in which the grain boundary resistance is decreased as compared with the related art and the lithium ion conduction property is improved can be produced.

Since the composite body of the active material and the electrolyte of the compositional formula (1) is formed, the contact area between the active material and the electrolyte is increased as compared with a battery in which the composite body is not formed, and the lithium ion conduction property of the battery is further improved. In addition, the composite body is directly produced from the first molded body and the mixture. Therefore, the production process can be simplified as compared with a case where the mixture is subjected to heating.

A method for producing a battery includes preparing a mixture by mixing a plurality of types of raw materials containing elements constituting a lithium composite metal oxide represented by the following compositional formula (1), forming a calcined body by subjecting the mixture to a first heating treatment, forming a powder by grinding the calcined body, preparing a mixed body by mixing the powder with an active material, molding the mixed body, forming a composite body including the active material and an electrolyte portion containing a crystalline electrolyte by subjecting the molded mixed body to a second heating treatment, and forming a current collector for the composite body.

$$Li_{7-x}La_3(Zr_{2-x}A_x)O_{12-y}F_y \quad (1)$$

In the formula, $0.1 \leq x \leq 1.0$, $0.0 < y \leq 1.0$, and A represents two or more types of Ta, Nb, and Sb.

According to this configuration, a lithium composite metal oxide represented by the compositional formula (1) is produced from the mixture obtained by mixing the raw materials containing fluorine (F). That is, a battery including an electrolyte in which the grain boundary resistance is decreased as compared with the related art and the lithium ion conduction property is improved can be produced.

Since the composite body of the active material and the electrolyte of the compositional formula (1) is formed, the contact area between the active material and the electrolyte is increased as compared with a battery in which the composite body is not formed, and the lithium ion conduction property of the battery is further improved. In addition, the composite body is produced from the powder obtained by grinding the calcined body and the active material by molding the mixed body. Therefore, the production process can be simplified as compared with a case where a molded body of the active material is prepared.

A method for producing a battery includes preparing a first mixture by mixing a plurality of types of raw materials containing elements constituting a lithium composite metal oxide represented by the following compositional formula (2), forming a calcined body by subjecting the first mixture to a first heating treatment, preparing a second mixture by mixing the calcined body with a fluorine-containing inorganic compound, forming a fired body by subjecting the second mixture to a second heating treatment, forming a powder by grinding the fired body, preparing a mixed body by mixing the powder with an active material, molding the mixed body, forming a composite body including the active material and an electrolyte portion containing a crystalline electrolyte by subjecting the molded mixed body to a third heating treatment, and forming a current collector for the composite body.

$$Li_{7-x}La_3(Zr_{2-x}A_x)O_{12} \qquad (2)$$

In the formula, $0.1 \leq x \leq 1.0$, and A represents two or more types of Ta, Nb, and Sb.

According to this configuration, a lithium composite metal oxide containing fluorine is produced from the second mixture containing a fluorine-containing inorganic compound. That is, a battery including an electrolyte in which the grain boundary resistance is decreased as compared with the related art and the lithium ion conduction property is improved can be produced.

Since the composite body of the active material and the electrolyte containing fluorine is formed, the contact area between the active material and the electrolyte is increased as compared with a battery in which the composite body is not formed, and the lithium ion conduction property of the battery is further improved. In addition, the composite body is produced by molding the mixed body from the powder obtained by grinding the fired body and the active material. Therefore, the production process can be simplified as compared with a case where a molded body of the active material is prepared.

In the method for producing a battery described above, in the preparing the mixed body, a slurry as the mixed body including the powder, the active material, and a solvent may be prepared.

According to this configuration, the mixed body is a slurry, and therefore, it becomes easy to handle the mixed body as compared with a case where the mixed body is a powder. In addition, it becomes easy to mold the mixed body into an arbitrary shape.

What is claimed is:

1. An electrolyte, comprising a lithium composite metal oxide selected from the group consisting of $Li_{6.3}La_3Zr_{1.3}Sb_{0.5}Ta_{0.2}O_{11}F_1$, $Li_{6.2}La_3Zr_{1.2}Sb_{0.4}Ta_{0.4}O_{11}F_1$, $Li_{5.95}La_3Zr_{0.95}Sb_{0.4}Ta_{0.4}Nb_{0.25}O_{11}F_1$, $Li_{6.35}La_3Zr_{1.35}Sb_{0.4}Nb_{0.25}O_{11}F_1$, and $Li_{6.7}La_3Zr_{1.7}Ta_{0.05}Nb_{0.25}O_{11}F_1$.

2. A battery, comprising:
a composite body including the electrolyte according to claim 1 and an active material;
an electrode provided at one face of the composite body; and
a current collector provided at another face opposite to the one face of the composite body.

3. The battery according to claim 2, wherein the active material is a positive electrode active material containing Li and O.

4. The battery according to claim 2, wherein the electrode is metallic Li.

5. An electronic apparatus, comprising the battery according to claim 2.

6. A method for producing an electrolyte comprising:
preparing a first mixture by mixing a plurality of types of raw materials containing elements constituting a lithium composite metal oxide represented by the following compositional formula except that the first mixture does not contain a fluorine-containing compound;
forming a calcined body by subjecting the first mixture to a first heating treatment;
preparing a second mixture by mixing the calcined body with a fluorine-containing inorganic compound; and
forming a crystalline electrolyte by subjecting the second mixture to a second heating treatment:

$$Li_{7-x}La_3(Zr_{2-x}A_x)O_{12-y}F_y$$

wherein $0.1 \leq x \leq 1.0$, $0.0 < y \leq 1.0$, and A represents two or more types of Ta, Nb, and Sb, and
the lithium composite metal oxide has a total ion conductivity of $1.5 \times 10^{-4}$ S/cm or more.

7. The method according to claim 6, wherein a heating temperature in the first heating treatment is 500° C. or higher and 650° C. or lower, and a heating temperature in the second heating treatment is 800° C. or higher and 1000° C. or lower.

8. A method for producing a battery comprising:
preparing a first mixture by mixing a plurality of types of raw materials containing elements constituting a lithium composite metal oxide represented by the following compositional formula except that the first mixture does not contain a fluorine-containing compound;
forming a calcined body by subjecting the first mixture to a first heating treatment;
preparing a second mixture by mixing the calcined body with a fluorine-containing inorganic compound;
forming a fired body by subjecting the second mixture to a second heating treatment;
preparing a slurry by grinding the fired body and thereafter mixing the ground fired body with a solvent;
forming a first molded body using an active material;
forming a composite body including the first molded body and an electrolyte portion containing a crystalline electrolyte by performing a third heating treatment in a state where the slurry and the first molded body are brought into contact with each other; and
forming a current collector for the composite body:

$$Li_{7-x}La_3(Zr_{2-x}A_x)O_{12-y}F_y$$

wherein $0.1 \leq x \leq 1.0$, $0.0 < y \leq 1.0$, and A represents two or more types of Ta, Nb, and Sb, and
the lithium composite metal oxide has a total ion conductivity of $1.5 \times 10^{-4}$ S/cm or more.

9. A method for producing a battery comprising:
preparing a first mixture by mixing a plurality of types of raw materials containing elements constituting a lithium composite metal oxide represented by the following compositional formula except that the first mixture does not contain a fluorine-containing compound;
forming a calcined body by subjecting the first mixture to a first heating treatment;
preparing a second mixture by mixing the calcined body with a fluorine-containing inorganic compound;

forming a fired body by subjecting the second mixture to a second heating treatment;

forming a powder by grinding the fired body;

preparing a mixed body by mixing the powder with an active material;

molding the mixed body;

forming a composite body including the active material and an electrolyte portion containing a crystalline electrolyte by subjecting the molded mixed body to a third heating treatment; and forming a current collector for the composite body:

$$Li_{7-x}La_3(Zr_{2-x}A_x)O_{12-y}F_y$$

wherein $0.1 \leq x \leq 1.0$, $0.0 < y \leq 1.0$, and A represents two or more types of Ta, Nb, and Sb, and the lithium composite metal oxide has a total ion conductivity of $1.5 \times 10^{-4}$ S/cm or more.

10. The method according to claim 9, wherein in the preparing the mixed body, a slurry as the mixed body including the powder, the active material, and a solvent is prepared.

11. The electrolyte according to claim 1, wherein the lithium composite metal oxide has a total ion conductivity of $2.8 \times 10^{-4}$ S/cm or more.

* * * * *